(12) United States Patent
Miyake et al.

(10) Patent No.: US 7,024,862 B2
(45) Date of Patent: Apr. 11, 2006

(54) SYSTEM AND METHOD FOR CONTROLLING COMBUSTION IN GAS TURBINE WITH ANNULAR COMBUSTOR

(75) Inventors: Yoshiaki Miyake, Aichi (JP); Tomoyoshi Nakae, Aichi (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 37 days.

(21) Appl. No.: 10/448,452

(22) Filed: May 30, 2003

(65) Prior Publication Data

US 2004/0107701 A1    Jun. 10, 2004

(30) Foreign Application Priority Data

May 31, 2002   (JP)   ............................. 2002-160214

(51) Int. Cl.
*F02C 9/00*   (2006.01)
(52) U.S. Cl. .......................................... 60/773; 60/794
(58) Field of Classification Search ................. 60/773, 60/794, 739, 740, 746, 39.21, 39.26, 39.27, 60/39.281
See application file for complete search history.

(56) References Cited

U.S. PATENT DOCUMENTS

| | | | | |
|---|---|---|---|---|
| 3,577,878 A | * | 5/1971 | Greenwood et al. | 60/39.23 |
| 3,765,171 A | | 10/1973 | Hagen et al. | 60/39.23 |
| 3,930,368 A | | 1/1976 | Anderson et al. | 60/39.23 |
| 3,938,324 A | * | 2/1976 | Hammond et al. | 60/737 |
| 4,138,842 A | | 2/1979 | Zwick | 60/39.23 |
| 4,315,405 A | * | 2/1982 | Pidcock et al. | 60/752 |
| 4,716,719 A | | 1/1988 | Takahashi et al. | 60/39.06 |
| 4,720,970 A | * | 1/1988 | Hudson et al. | 60/804 |
| 4,944,149 A | * | 7/1990 | Kuwata | 60/39.23 |
| 5,226,287 A | * | 7/1993 | Ng | 60/39.281 |
| 5,239,818 A | * | 8/1993 | Stickles et al. | 60/804 |
| 5,349,812 A | * | 9/1994 | Taniguchi et al. | 60/39.23 |
| 5,351,474 A | * | 10/1994 | Slocum et al. | 60/39.23 |
| 5,469,700 A | | 11/1995 | Corbett et al. | 60/39.06 |
| 5,802,854 A | * | 9/1998 | Maeda et al. | 60/737 |
| 5,878,566 A | | 3/1999 | Endo et al. | 60/39.03 |
| 5,884,483 A | * | 3/1999 | Munro | 60/739 |
| 5,916,126 A | | 6/1999 | Szillat et al. | 60/39.09 |
| 6,079,198 A | * | 6/2000 | Prowse et al. | 60/776 |
| 6,092,362 A | * | 7/2000 | Nagafuchi et al. | 60/39.281 |

(Continued)

FOREIGN PATENT DOCUMENTS

EP         0 529 900 A1    3/1993

(Continued)

OTHER PUBLICATIONS

European Search Report dated Jun. 2, 2005 (6 pages).

*Primary Examiner*—William H. Rodriguez
(74) *Attorney, Agent, or Firm*—Armstrong, Kratz, Quintos, Hanson & Brooks, LLP

(57) ABSTRACT

A gas turbine system composed of a gas turbine engine and a controller. The gas turbine engine includes an annular combustor, and a turbine driven by combustion gas from the annular combustor to rotate on a longitudinal centerline axis of the gas turbine engine. The annular combustor is comprised of an outer casing, a liner disposed in the outer casing, and a plurality of dilution air regulators introducing dilution air into the liner. The plurality of dilution air regulators are circumscribed about the longitudinal centerline axis and spaced apart at substantially equal intervals. The controller controls the plurality of dilution air regulators to individually adjust dilution air flows through the plurality of dilution air regulators into the liner.

16 Claims, 12 Drawing Sheets

U.S. PATENT DOCUMENTS

| | | | |
|---|---|---|---|
| 6,393,823 B1 * | 5/2002 | Badeer | 60/778 |
| 6,655,152 B1 * | 12/2003 | Griffiths et al. | 60/773 |
| 6,681,556 B1 * | 1/2004 | Mistry et al. | 60/39.094 |
| 6,786,049 B1 * | 9/2004 | Parsons et al. | 60/776 |
| 6,810,655 B1 * | 11/2004 | Davis et al. | 60/39.281 |

FOREIGN PATENT DOCUMENTS

| | | |
|---|---|---|
| JP | 5-195822 | 8/1993 |
| JP | 11-030423 | 2/1999 |
| JP | 11-30423 | 2/1999 |
| JP | 2000-46332 | 2/2000 |

\* cited by examiner

SYSTEM AND METHOD FOR CONTROLLING COMBUSTION IN GAS TURBINE WITH ANNULAR COMBUSTOR

BACKGROUND OF THE INVENTION

1. Field of the Invention

The present invention is related, in general, to a gas turbine engine system, and more particularly, to a technology for controlling fuel combustion in a gas turbine engine with an annular combustion system.

2. Description of the Related Art

Gas turbines are widely used to supply power for various machines, such as ships, vehicles, airplanes, and electric generators. As shown in FIG. 1, an exemplary gas turbine includes a compressor(not shown), an annular combustor 101, a turbine 102, and a fuel supply system 103. The combustor 101 is provided with compressed air from the compressor and fuel from the fuel supply system 103. The fuel supply system 103 includes a main fuel flow regulator 103a which controls the flow of the fuel supplied for the combustor 101. The fuel is mixed with the compressed air, and burned in the combustor 101. The resulting flow of combustion products out of the combustor 101 drives the turbine 102.

The combustor 101 includes an annular outer casing 104 and an annular liner 105, which are disposed coaxially about the longitudinal centerline axis of the combustor 101. The compressed air from the compressor is introduced between the outer casing 104 and the liner 105. A plurality of fuel nozzles 106 (one shown) are disposed in the liner 105, being spaced at substantially equal intervals in the circumferential direction. The liner 105 has a combustion air hole (not shown) to introduce combustion air into the liner 105.

The fuel provided for the combustor 101 is delivered to each fuel nozzle 106. The fuel nozzles 106 inject the fuel into combustion zone 105a in the liner 105. The injected fuel is burned to produce combustion gas.

The liner 105 has dilution holes 107 to introduce dilution air 107a immediately downstream of the combustion zone 105a. The combustion gas is delivered to the turbine 102 after being mixed with the dilution air 107a. The turbine 102 is driven by the combustion gas.

Optimization of the state of the combustion in the combustor is of much importance. A gas turbine engine for optimizing the state of the combustion zone is disclosed in Japanese Open Laid Patent Application No. Jp-A 2000-46332, and Japanese Open Laid Patent Application No. Jp-A Heisei 5-195822. The disclosed gas turbine engine includes fuel nozzles (or burners) in a combustor, the fuel nozzles being grouped into two or more individually controllable nozzle groups. The individual control of the nozzle groups achieves optimized combustion state in response to the operational states of the gas turbine engine.

In a gas turbine with an annular combustor, various factors may undesirably cause inhomogeneous flame temperature and turbine inlet temperature in the circumferential direction of the combustor. The factors may include inevitable differences in dimensions of a liner and fuel nozzles, inhomogeneous distortion of the liner, and unstable combustion.

Inhomogeneous flame temperature may result in emissions of environmental pollutants, including carbon monoxide (CO), oxides of nitrogen ($NO_x$), and unburned hydrocarbon (UHC). Inhomogeneous flame temperature may result in a flame temperature which is excessively increased in one potion of the combustion zone while being inappropriately decreased in other portion. Excessively high flame temperature causes emission of oxides of nitrogen, which are generally referred to as $NO_x$, and inappropriately low flame temperature causes emission of carbon monoxide. In addition, the inhomogeneous flame temperature may cause a blowout in the combustor.

Furthermore, a non-homogeneous turbine inlet temperature may result in a turbine inlet temperature which is excessively increased in one potion of the turbine. Excessively high turbine inlet temperature may damage the blades of the turbine.

SUMMARY OF THE INVENTION

Therefore, an object of the present invention is to provide a technology for achieving homogeneous flame temperature in the circumferential direction in a gas turbine engine with an annular combustor.

Another object of the present invention is to provide a technology for achieving homogeneous turbine inlet temperature in a gas turbine engine with an annular combustor.

In one aspect of the present invention, a gas turbine system is composed of a gas turbine engine, and a controller. The gas turbine engine includes an annular combustor, and a turbine driven by combustion gas from the annular combustor to rotate on a longitudinal centerline axis of the gas turbine engine. The annular combustor is comprised of an outer casing, a liner disposed in the outer casing, and a plurality of dilution air regulators introducing dilution air into the liner. The plurality of dilution air regulators are circumscribed about the longitudinal centerline axis and spaced apart at substantially equal intervals. The controller controls the plurality of dilution air regulators to individually adjust dilution air flows through the plurality of dilution air regulators into the liner.

When the gas turbine system further includes a plurality of turbine outlet temperature sensors disposed at a turbine outlet of the turbine (4) to measure turbine outlet temperatures at positions thereof, the plurality of turbine outlet temperature sensors being circumscribed about the longitudinal centerline axis, and spaced apart at equal intervals, the controller advantageously adjusts the dilution air flows in response to the turbine outlet temperatures.

When the gas turbine system further includes a combustor inlet state sensor disposed at an inlet of the annular combustor to obtain a state of the combustor inlet, it is preferable that the controller includes a dilution air flow instruction producing unit producing a plurality of eventual dilution air flow instructions respectively associated with the plurality of dilution air regulators, and the plurality of dilution air regulators respectively introduce the dilution air into the liner in response to the plurality of eventual dilution air flow instructions associated therewith, the dilution air flow instruction producing unit including a first module producing a plurality of feedback-based dilution flow instructions through an isochronous feedback control in response to the turbine outlet temperatures, a second module which establishes a self-organized map in response to the eventual dilution air flow instructions and the state of the combustor inlet, and produces a plurality of SOM-based dilution air flow instructions using an SOM algorithm based on the self-organized map, and a third module producing the plurality of eventual dilution air flow instructions from the plurality of feedback-based and SOM-based dilution air flow instructions.

When the gas turbine engine system further includes a rotation speed sensor measuring a rotation speed of the turbine, an temperature sensor measuring a combustor inlet temperature, and a pressure sensor measuring a combustor inlet pressure, it is preferable that the controller includes a dilution air flow instruction producing unit producing a plurality of eventual dilution air flow instructions respectively associated with the plurality of dilution air regulators, and that the plurality of dilution air regulators respectively introduce the dilution air into the liner in response to the plurality of eventual dilution air flow instructions associated therewith, the dilution air flow instruction producing unit including a first module producing a plurality of feedback-based dilution air flow instructions through an isochronous feedback control in response to the turbine outlet temperatures, a second module which establishes a self-organized map in response to the eventual dilution air flow instructions, the rotation speed of the turbine, the combustor inlet temperature, and the combustor inlet pressure, and produces a plurality of SOM-based dilution air flow instructions using an SOM algorithm based on the self-organized map, and a third module producing the plurality of eventual dilution air flow instructions from the plurality of feedback-based and SOM-based dilution air flow instructions.

In the event that the annular combustor further includes a plurality of fuel nozzles circumscribed about the longitudinal centerline axis, and spaced apart at substantially equal intervals, and the gas turbine system further includes a plurality of fuel flow regulators respectively feeding fuel to the plurality of fuel nozzles, the controller advantageously controls the plurality of fuel flow regulators to individually adjust fuel flows into the plurality of fuel nozzles.

In this case, it is advantageous that the gas turbine system further includes a plurality of environmental pollutant sensor units disposed at a turbine outlet of the turbine to measure respective emission levels of environmental pollutant at positions thereof, the environmental pollutant sensor units being circumscribed about the longitudinal centerline axis and spaced apart at substantially equal intervals, and a plurality of turbine outlet temperature sensors disposed at a turbine outlet of the turbine to measure turbine outlet temperatures at positions thereof, the plurality of turbine outlet temperature sensors being circumscribed about the longitudinal centerline axis, and spaced apart at equal intervals, the controller adjusting the dilution air flows in response to the turbine outlet temperatures, and adjusting the fuel flows in response to the emission levels of the environmental pollutant.

Each of the plurality of environmental pollutant sensor units may includes a $NO_x$ sensor measuring a $NO_x$ emission level, and a CO sensor measuring a CO emission level, and the controller may adjust the fuel flows in response to the $NO_x$ emission levels and the CO emission levels. In this case, the controller advantageously calculates a set of emission indices through an emission evaluation function which includes a first term dependent on a logarithm of the $NO_x$ emission levels, and a second term dependent on a logarithm of the CO emission levels, while adjusting the fuel flows in response to the set of emission indices.

Each of the plurality of environmental pollutant sensor units may include a $NO_x$ sensor measuring a $NO_x$ emission level, and an UHC (unburned hydrocarbon) sensor measuring an UHC emission level, and the controller may adjust the fuel flows in response to the $NO_x$ emission levels and the UHC emission levels. In this case, the controller advantageously calculates a set of emission indices through an emission evaluation function which includes a first term dependent on a logarithm of the $NO_x$ emission levels, and a second term dependent on a logarithm of the UHC emission levels, while adjusting the fuel flows in response to the set of emission indices.

In the event that the gas turbine engine system further includes a rotation speed sensor measuring a rotation speed of the turbine, an temperature sensor measuring a combustor inlet temperature, and a pressure sensor measuring a combustor inlet pressure, it is preferable that the controller includes an instruction producing unit producing a plurality of eventual fuel flow instructions respectively associated with the plurality of fuel nozzles, and a plurality of eventual dilution air flow instructions respectively associated with the plurality of dilution air regulators, the plurality of fuel flow regulators respectively feed the fuel to the plurality of fuel nozzles in response to the plurality of eventual fuel flow instructions associated therewith, and the plurality of dilution air regulators respectively introduce the dilution air into the liner in response to the plurality of eventual dilution air flow instructions associated therewith, the instruction producing unit including a first module producing a plurality of feedback-based fuel flow instructions through an isochronous feedback control in response to the emission levels of the environmental pollutant, a second module producing a plurality of feedback-based dilution air flow instructions through another isochronous feedback control in response to the turbine outlet temperatures, a third module which establishes a self-organized map in response to the eventual fuel flow instructions, the eventual dilution air flow instructions, the rotation speed of the turbine, the combustor inlet temperature, and the combustor inlet pressure, and produces a plurality of SOM based fuel flow instructions, and a plurality of SOM-based dilution air flow instructions using an SOM algorithm based on the self-organized map, and a fourth module producing the plurality of eventual fuel flow instructions from the plurality of feedback-based and SOM-based fuel flow instructions, while producing the plurality of eventual dilution air flow instructions from the plurality of feedback-based and SOM-based dilution air flow instructions, In another aspect of the present invention, a gas turbine system is composed of a gas turbine engine, a plurality of fuel flow regulators, and a controller. The gas turbine engine includes an annular combustor, and a turbine driven by combustion gas from the annular combustor to rotate on the longitudinal centerline axis. The annular combustor includes a plurality of fuel nozzles circumscribed about an longitudinal centerline axis of the gas turbine engine, and spaced apart at substantially equal intervals. The plurality of fuel flow regulators respectively feed fuel to the plurality of fuel nozzles. The controller controls the plurality of fuel flow regulators to individually adjust fuel flows into the fuel nozzles.

When the gas turbine system further includes a plurality of turbine outlet temperature sensors disposed at a turbine outlet of the turbine to measure turbine outlet temperatures at positions thereof, the plurality of turbine outlet temperature sensors being circumscribed about the longitudinal centerline axis, and spaced apart at equal intervals, the controller advantageously adjusts the fuel flows in response to the turbine outlet temperatures.

In the event that the gas turbine system further includes a plurality of environmental pollutant sensor units disposed at a turbine outlet of the turbine to measure respective emission levels of environmental pollutant at positions thereof, the environmental pollutant sensor units being circumscribed about the longitudinal centerline axis and spaced apart at substantially equal intervals, the controller advantageously adjusts the fuel flows in response to the emission levels of the environmental pollutant.

In still another aspect of the present invention, a method for operating a gas turbine engine is composed of:
  providing a gas turbine engine including:
    an annular combustor comprising:
      an outer casing;
      a liner disposed in the outer casing; and
      a plurality of dilution air regulators introducing dilution air into the liner, the plurality of dilution air regulators being circumscribed about a longitudinal centerline axis of the gas turbine engine and spaced apart at equal intervals, and
    a turbine driven by combustion gas from the annular combustor to rotate on the longitudinal centerline axis,
  individually adjusting dilution air flows through the plurality of dilution air regulators.

In yet still another aspect of the present invention, a method for operating a gas turbine engine is composed of:
  providing a gas turbine engine including:
    an annular combustor comprising a plurality of fuel nozzles circumscribed about a longitudinal centerline axis of the gas turbine engine, and spaced apart at equal intervals, and
    a turbine driven by combustion gas from the annular combustor to rotate on the longitudinal centerline axis,
  individually adjusting fuel flows into the plurality of fuel nozzles.

DESCRIPTION OF THE PREFERRED EMBODIMENTS

The gas turbine system in accordance with the present invention will be described below in detail with reference to the attached drawings.

Figure 1:
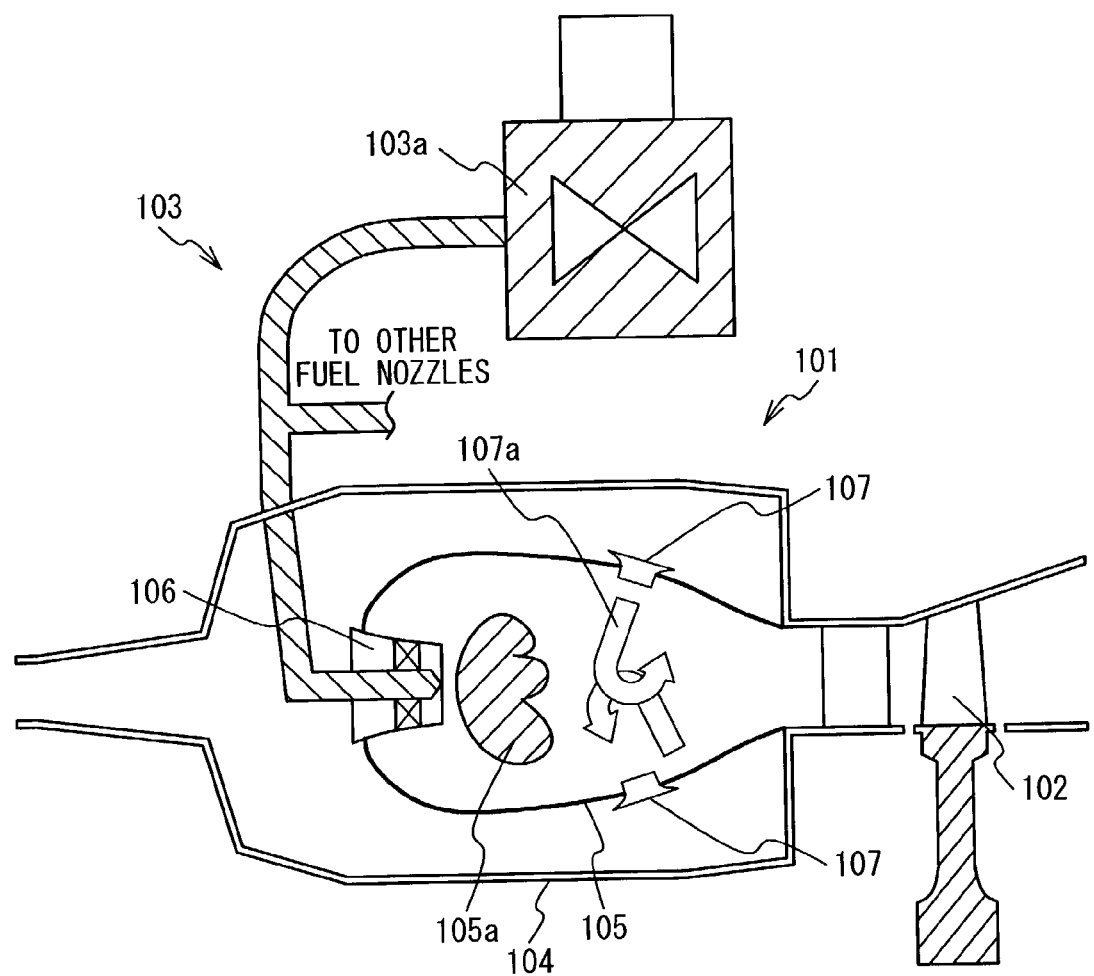
FIG. 1 is a conventional gas turbine engine system.
Figure 2:
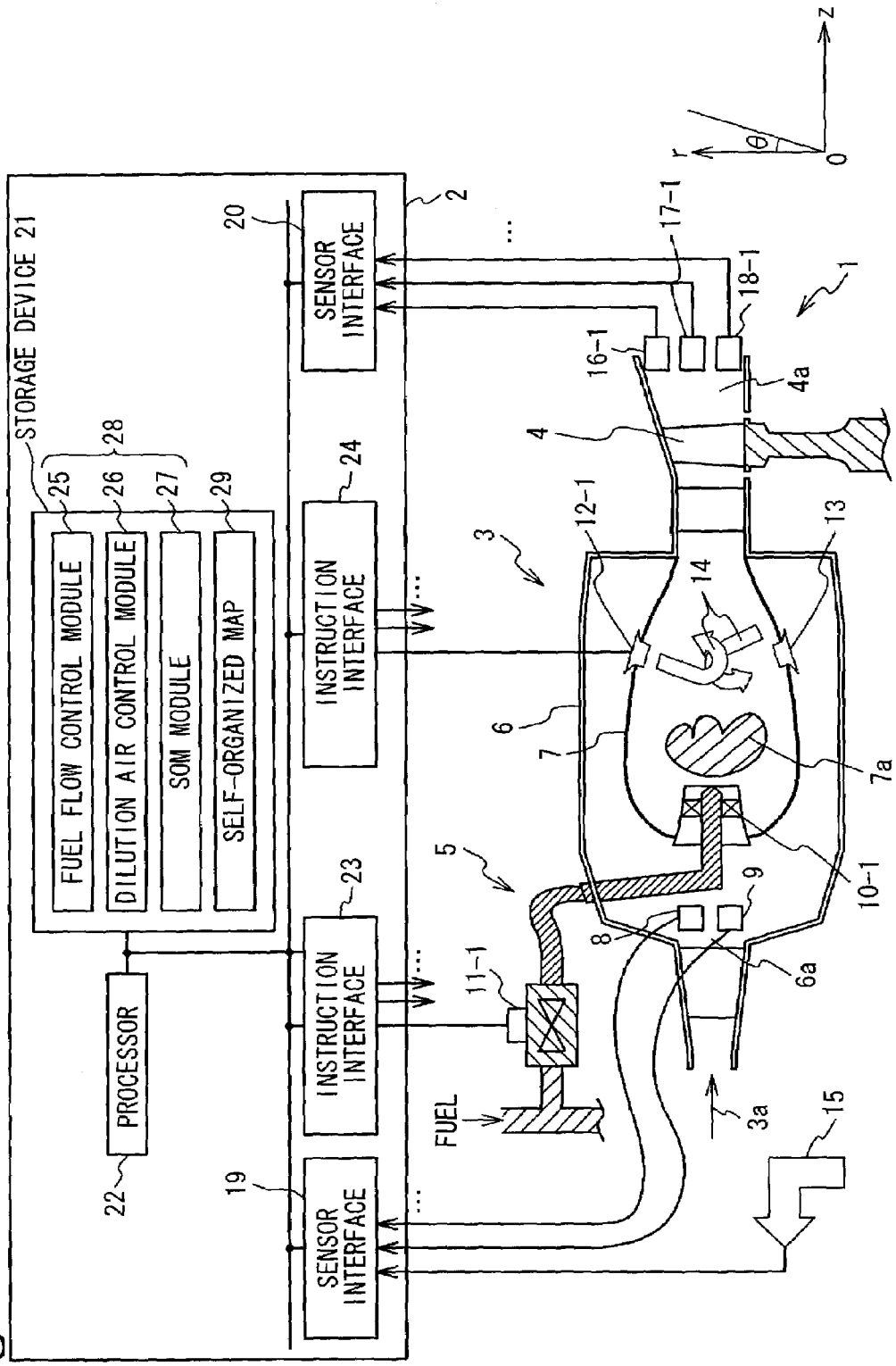
FIG. 2 is a schematic of a gas turbine engine system in one embodiment in accordance with the present invention.

In one embodiment, as shown in FIG. 2, a gas turbine system includes a gas turbine engine 1 and an electronic controller 2. The gas turbine engine 1 is controlled by the controller 2.

The gas turbine engine 1 includes a compressor (not shown), an annular combustor 3, a turbine 4, and a fuel supply system 5. The compressor feeds compressed air 3a to the combustor 3, and the fuel supply system 5 feeds fuel to the combustor 3. The combustor 3 mixes the fuel with the compressed air, and burns the fuel to feed combustion gas to the turbine 4. The turbine 4 is driven by the combustion gas to rotate on a turbine shaft (not shown) disposed along the longitudinal centerline axis (z-axis) of the gas turbine engine 1.

The combustor 4 includes an annular outer casing 6. The outer casing 6 has a combustor inlet 6a through which the compressed air 3a from the compressor is introduced therein. A combustor inlet temperature sensor 8 and a combustor inlet pressure sensor 9 are disposed at the combustor inlet 6a to measure the combustor inlet temperature $T^{IN}$ and the combustor inlet pressure P, respectively. The combustor inlet temperature $T^{IN}$ and the combustor inlet pressure P are provided for the controller 2.

An annular liner 7 is disposed in the outer casing 6. The outer casing 6 and the liner 7 are disposed coaxially about the longitudinal centerline axis of the gas turbine engine 1.

The liner 7 has combustion air holes (not shown). Combustion air, which is a portion of compressed air 3a, is introduced into the liner 7 through the combustion air holes.

Figure 3:
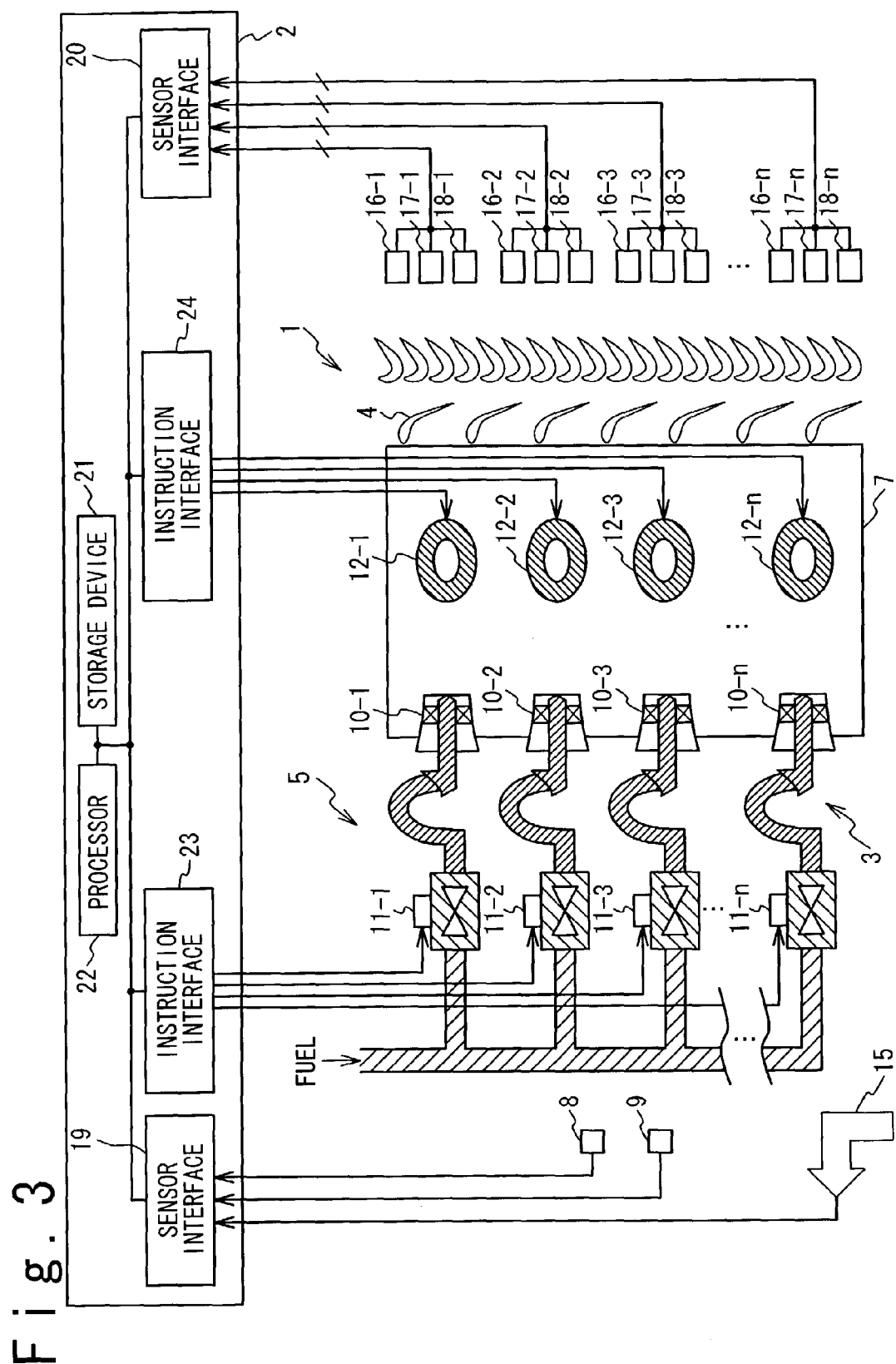
FIG. 3 is another schematic of a gas turbine engine system in one embodiment in accordance with the present invention.

A plurality of fuel nozzles 10-1 to 10-n are disposed in the liner 7, n being a natural number equal to or more than 2. The fuel nozzles 10-1 to 10-n are circumscribed about the longitudinal centerline axis of the gas turbine engine 1, and spaced apart at substantially equal intervals. As shown in FIG. 3, the fuel nozzles 10-1 to 10-n are supplied with fuel through fuel flow regulators 11-1 to 11-n, respectively. The fuel flow regulators 11-1 to 11-n control the flows of the fuel delivered to the fuel nozzles 10-1 to 10-n, respectively. The fuel flow regulators 11-1 to 11-n, which are respectively associated with fuel nozzles 10-1 to 10-n, enables individual control of the fuel flows into the fuel nozzles 10-1 to 10-n. The individual control of the fuel flows into the fuel nozzles 10-1 to 10-n advantageously achieves homogeneous flame temperature in the combustor 3.

As shown in FIG. 2, the fuel nozzles 10-1 to 10-n inject fuel into the combustion zone 7a in the liner 7. The injected fuel is mixed with the combustion air and burned in the combustion zone 7a to generate combustion gas.

The liner 7 is provided with dilution air regulators 12-1 to 12-n (one shown) and dilution air holes 13 (one shown). The dilution air regulators 12-1 to 12-n and the dilution air holes 13 are circumscribed about the longitudinal axis and spaced apart at substantially equal intervals. As shown in FIG. 2, the dilution air regulators 12-1 to 12-n are coupled to the controller 2.

Referring back to FIG. 2, although all of the dilution air regulators 12-1 to 12-n and the dilution air holes 13 introduce dilution air 14 into the liner 7, the function of the dilution air regulators 12-1 to 12-n is different from that of the dilution air holes 13: the dilution air regulators 12-1 to 12-n individually regulate flows of the dilution air 14 under the control of the controller 2, while dilution air holes 13 do not regulate the flows of the dilution air 14. Individual control of the dilution air flows effectively homogenizes the temperature of the combustion gas in the circumferential direction, and thereby homogenizes the turbine inlet temperature.

The combustion gas from the combustion zone 5a is mixed with the dilution air 14 and fed to the turbine 14. After being mixed with the dilution air 14, the combustion gas drives and rotates the turbine 4.

A rotation speed sensor 15 is disposed to measure the rotation speed of the turbine 4, which is referred to as turbine rotation speed NH. The turbine rotation speed NH is provided for the controller 2.

The exhaust from the turbine 4 is released to the atmosphere through the turbine outlet 4a. A plurality of $NO_x$ sensors 16-1 to 16-n (one shown in FIG. 2), a plurality of CO sensors 17-1 to 17-n (one shown in FIG. 2), and a plurality of turbine outlet temperature sensors 18-1 to 18-n (one shown in FIG. 2) are disposed at the turbine outlet 4a. The $NO_x$ sensor 16-i respectively adjoin the CO sensors 17-i to form a sensor pair.

The $NO_x$ sensors 16-1 to 16-n respectively measure $NO_x$ emission levels at the positions thereof. The $NO_x$ sensors 16-1 to 16-n are circumscribed about the longitudinal axis, and spaced apart at substantially equal intervals. The $NO_x$ sensors 16-1 to 16-n provide the measured $NO_x$ emission levels for the controller 2.

The CO sensors 17-1 to 17-n respectively measure CO emission levels at the positions thereof. The CO sensors 17-1 to 17-n are circumscribed about the longitudinal axis and spaced apart at substantially equal intervals. The CO sensors 17-1 to 17-n provide the measured CO emission levels for the controller 2.

The turbine outlet temperature sensors 18-1 to 18-n respectively measure turbine outlet temperatures at the position thereof. The turbine outlet temperature sensors 18-1 to 18-n are circumscribed about the longitudinal axis and spaced apart at substantially equal intervals. The turbine outlet temperature sensors 18-1 to 18-n provides the measured turbine outlet temperatures for the controller 2.

As shown in FIG. 2, the controller 2 includes sensor interfaces 19 and 20, a storage device 21, a processor 22, instruction interfaces 23, and 24.

The sensor interface 19 receives the combustor inlet temperature $T^{IN}$, the combustor inlet pressure P, and the turbine rotation speed NH from the temperature sensor 8, the pressure sensor 9, and the rotation speed sensor 16, respectively.

The sensor interface 20 receives the $NO_x$ emission levels, the CO emission levels, and the turbine outlet temperatures from the $NO_x$ sensors 16-1 to 16-n, the CO sensors 17-1 to 17-n, and the turbine outlet temperatures 18-1 to 18-n.

The storage device 21 stores therein control software 28, and a self-organized (SOM) map 29. The control software 28 includes a fuel flow control module 25, a dilution air flow control module 26, and a SOM module 27.

The fuel flow control module 25 is a computer program used to produce fuel flow instructions $WFC_1$ to $WFC_n$, which respectively represent desired fuel flows into the fuel nozzle 10-1 to 10-n.

The dilution air flow control module is a computer program used to produce dilution air flow instructions $DAC_1$ to $DAC_n$, which respectively represent desired dilution air flow through the dilution air regulators 12-1 to 12-n.

The SOM module 27 is a computer program used to produce SOM-based fuel flow instructions $WFC^{SOM}_1$ to $WFC^{SOM}_n$, and SOM-based dilution air flow instructions $DAC^{SOM}_1$ to $DAC^{SOM}_n$ through an SOM algorithm on the basis of the self-organized map 29, the SOM algorithm being one of neural network algorithms. As described later, the SOM-based fuel flow instructions $WFC^{SOM}_1$ to $WFC^{SOM}_n$ are used to eventually determine the fuel flow instructions $WFC_1$ to $WFC_n$, and the SOM-based dilution air flow instructions $DAC^{SOM}_1$ to $DAC^{SOM}_n$ are used to eventually determine the dilution air flow instructions $DAC_1$ to $DAC_n$.

The processor 22 executes the control software 28 to produce the fuel flow instructions $WFC_1$ to $WFC_n$ and the dilution air flow instructions $DAC_1$ to $DAC_n$.

The fuel flow instructions $WFC_1$ to $WFC_n$ are respectively provided for the fuel flow regulators 11-1 to 11-n through the instruction interface 23. The fuel flow regulators 11-1 to 11-n are respectively responsive to the fuel flow instructions $WFC_1$ to $WFC_n$ to regulate the fuel flows into the fuel nozzles 10-1 to 10-n at the desired values indicated in the fuel flow instructions $WFC_1$ to $WFC_n$.

The dilution air flow instructions $DAC_1$ to $DAC_n$ are respectively provided for the dilution air regulators 12-1 to 12-n through the instruction interface 24. The dilution air regulators 12-1 to 12-n are respectively responsive to the dilution air flow instructions $DAC_1$ to $DAC_n$ to regulate the dilution air flows through the dilution air regulators 12-1 to 12-n at the desired values indicated in the dilution air flow instructions $DAC_1$ to $DAC_n$.

Figure 4:
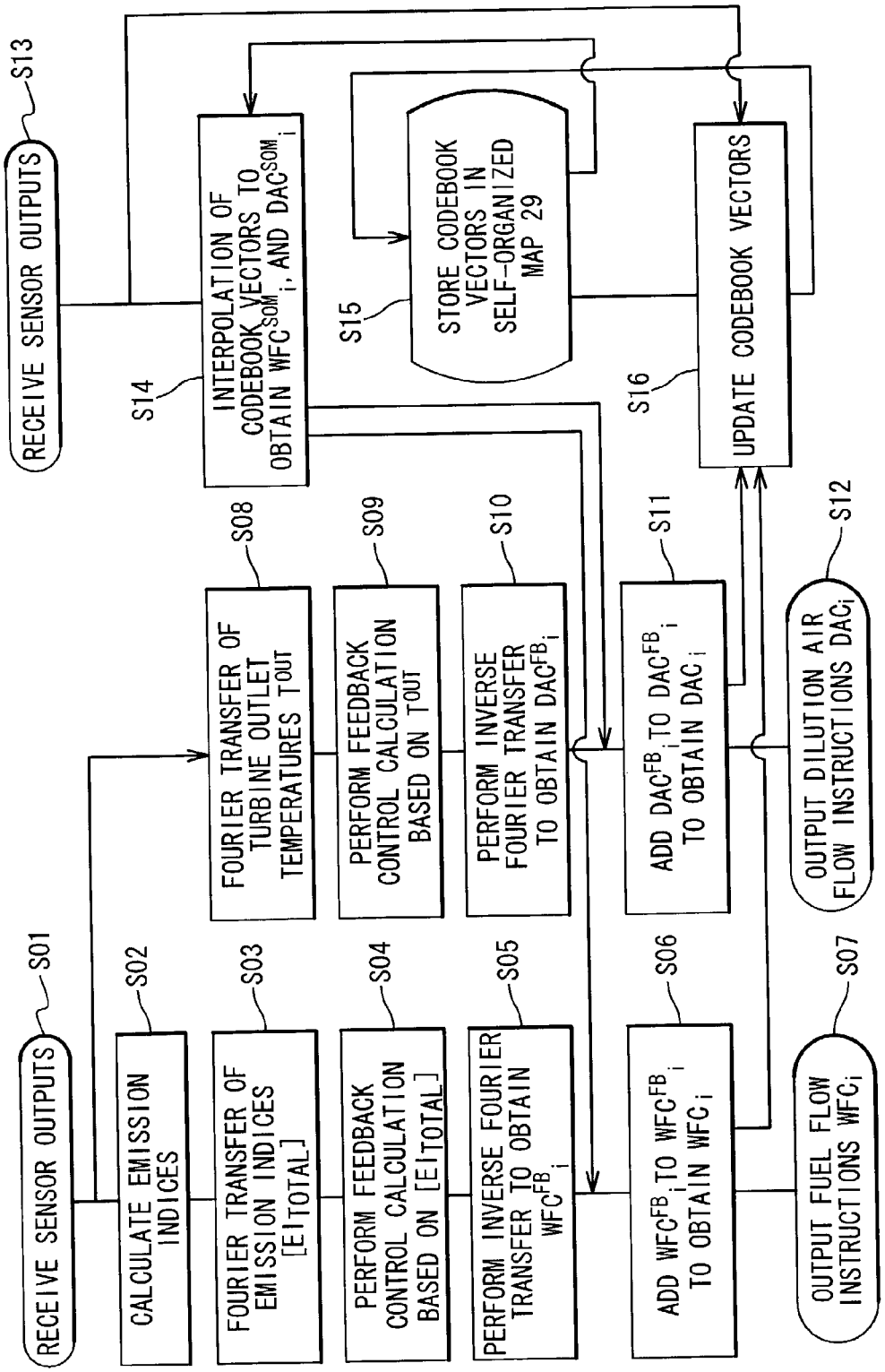
FIG. 4 shows a control flow of the gas turbine engine system in one embodiment.

FIG. 4 shows a control flow of the control software 28. Steps S02 through S07 are executed by the fuel flow control module 25, and Steps S08 through S12 are executed by the dilution air flow control module 26. Steps S14 through S16 are executed by the SOM module 27 and other steps are executed by the main routine of the control software 28.

At Step S01, the $NO_x$ emission levels, the CO emission levels, and the turbine outlet temperatures are inputted to the controller 2 from the $NO_x$ sensors 16-1 to 16-n, the CO sensors 17-1 to 17-n, and the turbine outlet temperatures sensors 18-1 to 18-n, respectively.

The fuel flow instructions $WFC_1$ to $WFC_n$ are produced in response to the inputted $NO_x$ emission levels, CO emission levels, and turbine outlet temperatures through Step S02 to S07.

At Step S02, emission indices are calculated from the $NO_x$ emission levels, and the CO emission levels. Each emission index is defined for each sensor pair of the $NO_x$ sensor and the CO sensor to provide evaluation of pollutant emission.

The emission index $[EI_{total}]_i$ associated with the sensor pair of the $NO_x$ sensor 16-i and CO sensor 17-I is defined by the following equation:

$$[EI_{total}]_i = \frac{A \cdot [NO_x]_i \cdot \log[NO_x]_i - [CO]_i \cdot \log(B \cdot [CO]_i)}{[NO_x]_i + [CO]_i}, \quad (1)$$

where $[NO_x]_i$ is the $NO_x$ emission level measured by the $NO_x$ sensor 16-i, and $[CO]_i$ is the CO emission level measured by the CO sensor 17-i.

The equation (1) implies that the emission indices are mainly subject to the $NO_x$ emission levels when the flame temperatures are relatively high in the combustor 3, because high flame temperatures result in high $NO_x$ emission levels and low CO emission levels. On the other hand, the emission indices are mainly subject to the CO emission levels, when the flame temperatures are relatively low.

The emission indices are used to determine the fuel flow instructions $WFC_1$ to $WFC_n$. The dependency of the fuel flow instructions $WFC_1$ to $WFC_n$ on the emission indices results in that the fuel flow instructions $WFC_1$ to $WFC_n$ to be responsive to the flame temperatures in the combustor 3. In other words, the dependency of the fuel flow instructions $WFC_1$ to $WFC_n$ on the emission indices results in that fuel flow instructions $WFC_1$ to $WFC_n$ are mainly subject to the $NO_x$ emission levels when the $NO_x$ emission levels are relatively high, while subject to the CO emission levels when the CO emission levels are relatively high. This enables a kind of a fuzzy control of the fuel flow instructions $WFC_1$ to $WFC_n$.

The terms depending on log $[NO_x]_i$ and log $[CO]_i$ in the equation (1) is of much importance. Those terms effectively improve the linearity of the control of the fuel flow instructions $WFC_1$ to $WFC_n$, and thus improve the controllability of the fuel flows into the fuel nozzles 10-1 to 10-n.

At Step S03, a discrete Fourier transform is performed with respect to the spatial distribution of the emission index, which is represented by the emission indices $[EI_{total}]_1$ to $[EI_{total}]_n$, to obtain Fourier coefficients $c_0$ to $c_{n/2}$, $c_0$ representing a dc component having a spatial frequency of 0, and $c_j$ representing a component having a wave number of j.

At Step S04, a Fourier transform of feedback-control-based fuel flow instructions $WFC^{fb}_1$ to $WFC^{fb}_n$ is calculated through the use of isochronous feedback control method on the basis of the Fourier coefficients $c_0$ to $c_{n/2}$ of the emission indices $[EI_{total}]_1$ to $[EI_{total}]_n$. The Fourier coefficients of feedback-control-based fuel flow instructions $WFC^{fb}_1$ to $WFC^{fb}_n$ are determined so that the components of the emission indices $[EI_{total}]_1$ to $[EI_{total}]_n$ other than the dc component are reduced to zero.

An inverse Fourier transform is then performed at Step S05 with respect to the Fourier transform of feedback-control-based fuel flow instructions $WFC^{fb}_1$ to $WFC^{fb}_n$ to obtain the feedback-control-based fuel flow instructions $WFC^{fb}_1$ to $WFC^{fb}_n$.

At Step S06, the fuel flow instructions $WFC_1$ to $WFC_n$ are calculated from the feedback-control-based fuel flow instructions $WFC^{fb}_1$ to $WFC^{fb}_n$ and the SOM-based fuel flow instructions $WFC^{SOM}_1$ to $WFC^{SOM}_n$. As described, the SOM-based fuel flow instructions $WFC^{SOM}_1$ to $WFC^{SOM}_n$ are obtained through an SOM algorithm by the SOM module 27. The detail of obtaining the SOM-based fuel flow instructions $WFC^{SOM}_1$ to $WFC^{SOM}_n$ will be described later. The fuel flow instructions $WFC_i$ is the sum of the feedback-control-based fuel flow instructions $WFC^{fb}_i$ and the SOM-based fuel flow instructions $WFC^{SOM}_i$.

At Step S07, the fuel flow instructions $WFC_1$ to $WFC_n$ are then outputted to the fuel flow regulators 11-1 to 11-n, respectively. The fuel flow regulators 11-1 to 11-n are respectively responsive to the fuel flow instructions $WFC_1$ to $WFC_n$ to regulate the fuel flows into the fuel nozzles 10-1 to 10-n at the desired values indicated in the fuel flow instructions $WFC_1$ to $WFC_n$.

The process thus-described allows the fuel flow instructions $WFC_1$ to $WFC_n$ to be determined so that the emission indices $[EI_{total}]_1$ to $[EI_{total}]_n$ are homogeneous. This results in that the flame temperatures are controlled to be homogenous in the circumferential direction, because the emission indices $[EI_{total}]_1$ to $[EI_{total}]_n$ correspond to the flame temperatures. The homogenous flame temperatures in the combustor 3 excludes combustion zones having excessively high or low flame temperatures, and thereby effectively reduces $NO_x$ and CO emission levels.

On the other hand, the turbine outlet temperatures, which are provided for the controller 2 at Step S01, are used to determine the dilution air flow instructions $DAC_1$ to $DAC_n$.

At Step S08, a discrete Fourier transform is performed with respect to the spatial distribution of the turbine outlet temperature which is represented by the turbine outlet temperatures $T^{OUT}_1$ to $T^{OUT}_n$ respectively measured by the turbine outlet temperature sensors 18-1 to 18-n, to obtain the Fourier coefficients $c'_0$ to $c'_{n/2}$, the $c'_0$ representing a dc component having a spatial frequency of 0, and $c'_j$ representing a component having a wave number of j.

At Step S09, a Fourier transform of feedback-control-based dilution air flow instructions $DAC^{fb}_1$ to $DAC^{fb}_n$ is then calculated through the use of isochronous feedback control method on the basis of the Fourier coefficients $c'_0$ to $c'_{n/2}$ of the turbine outlet temperatures $T^{OUT}_1$ to $T^{OUT}_n$. The Fourier coefficients of feedback-control-based dilution air flow instructions $DAC^{fb}_1$ to $DAC^{fb}_n$ are determined so that the components of the turbine outlet temperatures $T^{OUT}_1$ to $T^{OUT}_n$ other than the dc component are reduced to zero.

An inverse Fourier transform is then performed at Step S10 with respect to the Fourier transform of feedback-control-based dilution air flow instructions $DAC^{fb}_1$ to $DAC^{fb}_n$ to obtain the feedback-control-based fuel flow instructions $DAC^{fb}_1$ to $DAC^{fb}_n$.

At Step S11, the dilution air flow instructions $DAC_1$ to $DAC_n$ are calculated from the feedback-control-based dilution air flow instructions $DAC^{fb}_1$ to $DAC^{fb}_n$ and the SOM-based dilution air flow instructions $DAC^{SOM}_1$ to $DAC^{SOM}_n$. As described, the SOM-based dilution air flow instructions $DAC^{SOM}_1$ to $DAC^{SOM}_n$ are obtained through the SOM algorithm by the SOM module 27. The detail of obtaining the SOM-based fuel flow instructions $DAC^{SOM}_1$ to $DAC^{SOM}_n$ will be described later. The dilution air flow instructions $DAC_i$ is the sum of the feedback-control-based dilution air flow instructions $DAC^{fb}_i$ and the SOM-based dilution air flow instructions $DAC^{SOM}_i$.

At Step S12, the dilution air flow instructions $DAC_1$ to $DAC_n$ are then outputted to the dilution air regulators 12-1 to 12-n, respectively. The dilution air regulators 12-1 to 12-n are respectively responsive to the dilution air flow instructions $DAC_1$ to $DAC_n$ to regulate the dilution air flows through dilution air regulators 12-1 to 12-n at the desired values indicated in the dilution air flow instructions $DAC_1$ to $DAC_n$.

An explanation of the SOM-based process for obtaining the SOM-based fuel flow instructions $WFC^{SOM}_1$ to $WFC^{SOM}_n$, and the SOM-based dilution air flow instructions $DAC^{SOM}_1$ to $DAC^{SOM}_n$ is given in the following.

The SOM-based process includes reception of sensor outputs at Step S13, calculation of the SOM-based instructions through interpolation on the basis of the self-organized map 29 at Step 14, update of codebook vectors of units (or neurons) described in the self-organized map 29 at Step 16, and storage of the updated codebook vectors in the self-organized map 29 at Step 15.

At Step S13, the combustor inlet temperature $T^{IN}$, the combustor inlet pressure P, and the turbine rotation speed NH are inputted to the controller 2 from the combustor inlet temperature sensor 8, the combustor inlet pressure sensor 9, and the turbine rotation speed sensor 15, respectively. The combustor inlet temperature $T^{IN}$, the combustor inlet pressure P, and the turbine rotation speed NH are used to the update of the self-organized map 29 and the interpolation for obtaining the SOM-based fuel flow instructions $WFC^{SOM}_1$ to $WFC^{SOM}_n$, and the SOM-based dilution air flow instructions $DAC^{SOM}_1$ to $DAC^{SOM}_n$.

Figure 5:
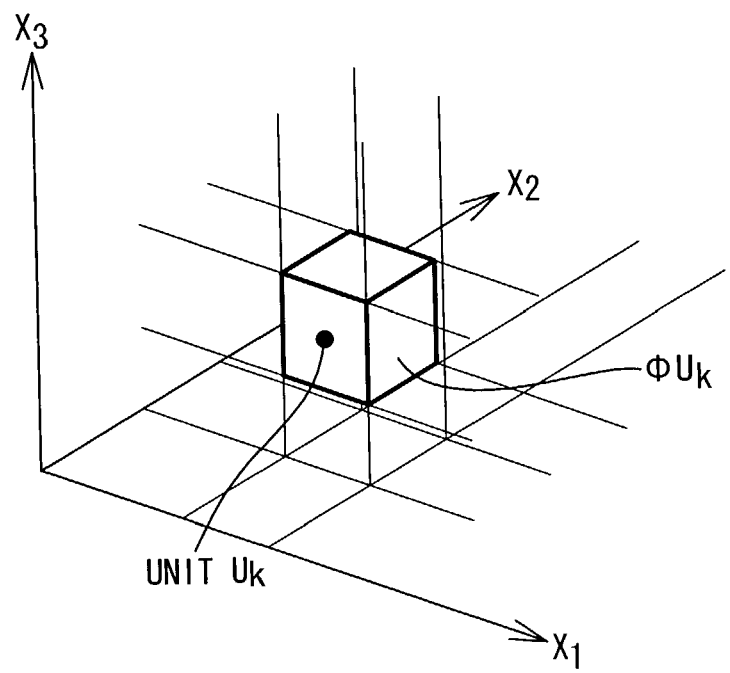
FIG. 5 shows a unit $U_k$ described in a self-organized map and a unit region $\phi U_k$ defined for the unit $U_k$.

FIG. 5 shows a 3-dimentional coordinate system defined in the self-organized map 29. A set of three axes: $X_1$-axis, $X_2$-axis, and $X_3$-axis are defined in the coordinate system, where $X_1$, $X_2$, and $X_3$ are independent scalar functions of the combustor inlet temperature $T^{IN}$, the combustor inlet pressure P, and the turbine rotation speed NH, respectively.

The self-organized map 29 consists of a 3-dimentional grid of units $U_k$, each of which has an associated codebook vector (or a connection weight vector) $U_k$. An input vector $X(=[X_1, X_2, X_3])$ is defined in the coordinate system to represent the status of the gas turbine engine 1.

The space defined by the coordinate system is divided into a large number of small polyhedrons, each polyhedron being referred to as a unit region $\phi U_k$. Each unit $U_k$ is located within the unit region $\phi U_k$.

The codebook vectors $U_k$ are updated at Step S16 according to the following equations (2a) and (2b):

$$U_k(t+1)=U_k(t)+\eta \cdot \{Y(t)-U_k(t)\}(X(t)\epsilon\phi U_k), \quad (2a)$$

$$U_k(t+1)=U_k(t)(X(t)\overline{\epsilon}\phi U_k), \quad (2b)$$

where t is a parameter representing a calculation step, $Y(t)$ is a control output vector defined by the following equations:

$$Y(t)=[X(t), WFC(t), DAC(t)], \quad (3a)$$

$$WFC(t)=[WFC_1(t), WFC_2(t), \ldots, WFC_n(t)], \quad (3b)$$

$$DAC(t)=[DAC_1(t), DAC_2(t), \ldots, DAC_n(t)], \quad (3c)$$

$X(t)$, $WFC_i(t)$, and $DAC_i(t)$ being the input vector X, $WFC_i$, and $DAC_i$ at the calculation step t.

As stated in the equations (2a) and (2b), one of the units is selected as a firing unit (or a winner) $U_k$ so that a coordinate identified by the input vector X is located within the unit region $\phi U_k$ of the firing unit $U_k$. It should be noted that this method of selecting a firing unit is different from that of the usual SOM algorithm, in which one of the unit which has the smallest Euclidean distance from the input vector X is selected as a firing unit (or a winner). Selecting a firing unit in accordance with the equations (2a) and (2b) effectively avoids localization of the codebook vectors $U_k$ of the units $U_k$, and thereby prevents the codebook vectors $U_k$ from being excessively influenced by the latest input vector $X(t)$, that is, the latest status of the gas turbine engine 1.

The updated codebook vector $U_k$ is stored in the self-organized map 29 at Step S15.

Figure 6:
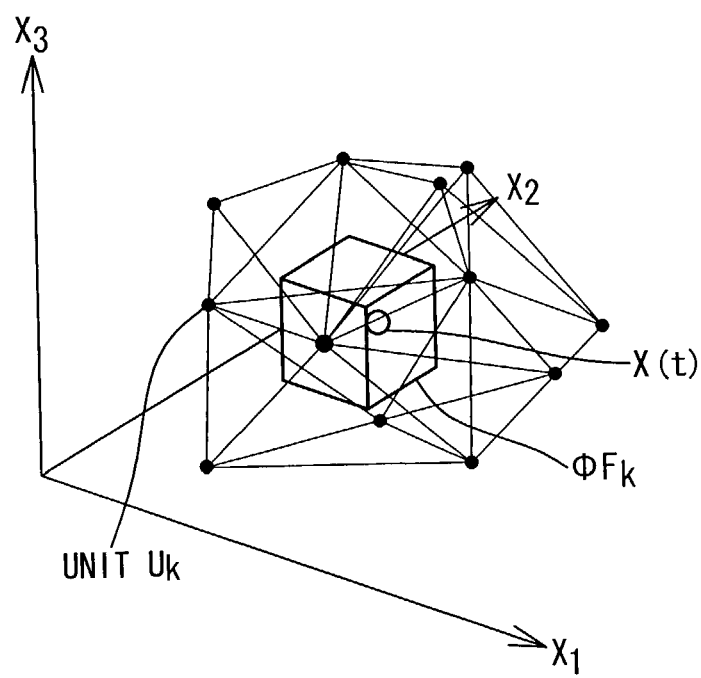
FIG. 6 shows an interpolation for obtaining an estimated vector Y.
Figure 7:
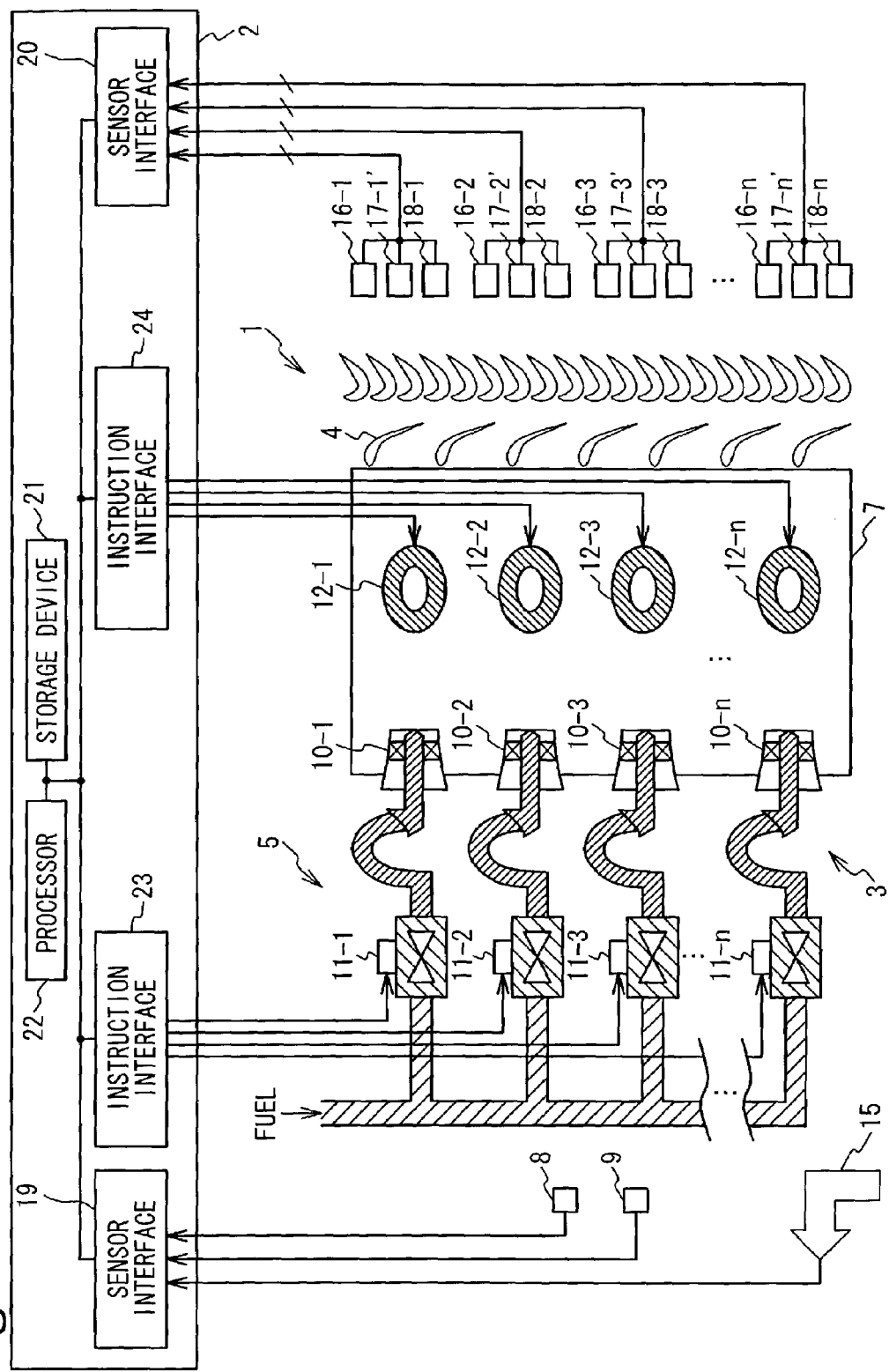
FIG. 7 shows a gas turbine engine system in an alternative of the embodiment.

At Step S14, the SOM-based fuel flow instructions $WFC^{SOM}_1$ to $WFC^{SOM}_n$, and the SOM-based dilution air flow instructions $DAC^{SOM}_1$ to $DAC^{SOM}_n$ are calculated on the basis of the self-organized map 29 through interpolation. The interpolation is achieved by using the codebook vectors $U_k$ stored in the self-organized map 29, FIG. 6 schematically illustrates the interpolation for obtaining the SOM-based fuel flow instructions $WFC^{SOM}_1$ to $WFC^{SOM}_n$, and the SOM-based dilution air flow instructions $DAC^{SOM}_1$ to $DAC^{SOM}_n$. The space defined by the $X_1$-axis to $X_3$-axis are differently divided into tetrahedrons which have their apexes on the units. An output vector $Y_{filt}$ associated with an input vector $X_{filt}$ representing the present status of the gas turbine engine 1 is obtained through interpolation with respect to the isometric coordinates in the tetrahedron in which the position identified by the input vector $X_{filt}$ is located.

The interpolation with respect to the isometric coordinates is achieved by using a vector $\zeta$ which satisfies the following equations:

$$X_{filt}=[X_a, X_b, X_c, X_d]*ae, \quad (4a)$$

$$1=[1,1,1,1]*ae, \quad (4b)$$

$$ae=[\zeta_a, \zeta_b, \zeta_c, \zeta_d], \quad (4c)$$

where $X_a$, $X_b$, $X_c$, and $X_d$ are position vectors of the units $U_a$, $U_b$, $U_c$, and $U_d$ which are positioned at the apexes of the tetrahedron where the position identified by the input vector $X_{filt}$ is located. The output vector $Y_{filt}$ is obtained from the interpolation represented by the following equation:

$$Y_{filt}=[Y_a, Y_b, Y_c, Y_d]*ae, \quad (5)$$

where vectors $Y_a$, $Y_b$, $Y_c$, and $Y_d$ are output vectors Y defined for the units $U_a$, $U_b$, $U_c$, and $U_d$, respectively.

An estimated vector Y, which includes the SOM-based fuel instructions $WFC^{SOM}_1$ to $WFC^{SOM}_n$, and the SOM-based dilution air instructions $DAC^{SOM}_1$ to $DAC^{SOM}_n$ as components thereof, is eventually obtained by calculating the average of the output vector $Y_{filt}$ with respect to an spatial filter region $\phi F$ that includes a position corresponding the input vector $X(t)$, which represents the present status of the gas turbine engine 1, at the center thereof. The estimated vector Y is obtained by the following equation: The SOM-based fuel instructions $WFC^{SOM}_1$ to $WFC^{SOM}_n$ is used to obtain the fuel instructions $WFC_1$ to $WFC_n$, and the SOM-based dilution air instructions $DAC^{SOM}_1$ to $DAC^{SOM}_n$ are used to obtain the dilution $$Y = \frac{\int_{\phi F} \{Y_{filt}\} d\phi F}{\int_{\phi F} d\phi F}. \quad (6)$$

air instructions $DAC_1$ to $DAC_n$.

As described, the fuel flows into the fuel nozzles 10-1 to 10-$n$ are individually controlled so that the emission indices $[EI_{total}]_i$ are homogenous in the circumferential direction. This results in that the flame temperatures in the combustor 3 are homogenous to exclude combustion zones at which flame temperatures are excessively high or low. The homogenous flame temperature effectively reduces the $NO_x$ emission level and the CO emission level in the exhaust of the gas turbine engine 1.

Furthermore, the dilution air flows through the dilution air regulators 12-1 to 12-$n$ are individually controlled so that the turbine outlet temperatures $T^{OUT}$ are homogenous to exclude excessively high or low temperature portions in the turbine 4. This effectively avoids the turbine 4 being damaged.

The gas turbine engine system is preferably used for an aircraft engine. When used for an aircraft engine, the exhaust is inevitably directly released to the atmosphere without processing the exhaust to reduce environmental pollutant. Therefore, the gas turbine engine system thus-described, which effectively reduces the $NO_x$ emission and the CO emission, is suited for an aircraft engine.

In an alternative embodiment, the gas turbine engine 1 may be control in response to emission levels of unburned hydrocarbon (UHC) in the exhaust in place of the CO emission levels.

In this case, the gas turbine engine system is modified as shown in FIG. 6. The CO sensor 17-1 to 17-$n$ are replaced with UHC sensors 17-1' to 17-$n$' which respectively measure the UHC levels at the position thereof. The fuel flow instructions $WFC_1$ to $WFC_n$ are determined on the basis of the UHC emission level. In detail, the emission indices are defined by the following equation:

$$[EI_{total}]_i = \frac{A \cdot [NO_x]_i \cdot \log[NO_x]_i - [UHC]_i \cdot \log(B \cdot [UHC]_i)}{[NO_x]_i + [UHC]_i}, \quad (1)'$$

where $[EI_{total}]_i$ is the emission index defined for the pair of the $NO_x$ sensor 16-$i$ and the UHC sensor 17-$i'$ and the $[UHC]_j$ is the UHC emission level measured by the UHC sensor 17-$i'$.

The control of the gas turbine engine 1 in response to the UHC emission levels $[UHC]_i$ is substantially equivalent to that in response to the CO emission levels [CO], because the UHC emission level increases as the flame temperature decreases, as is the case with the CO emission level.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

Figure 8:
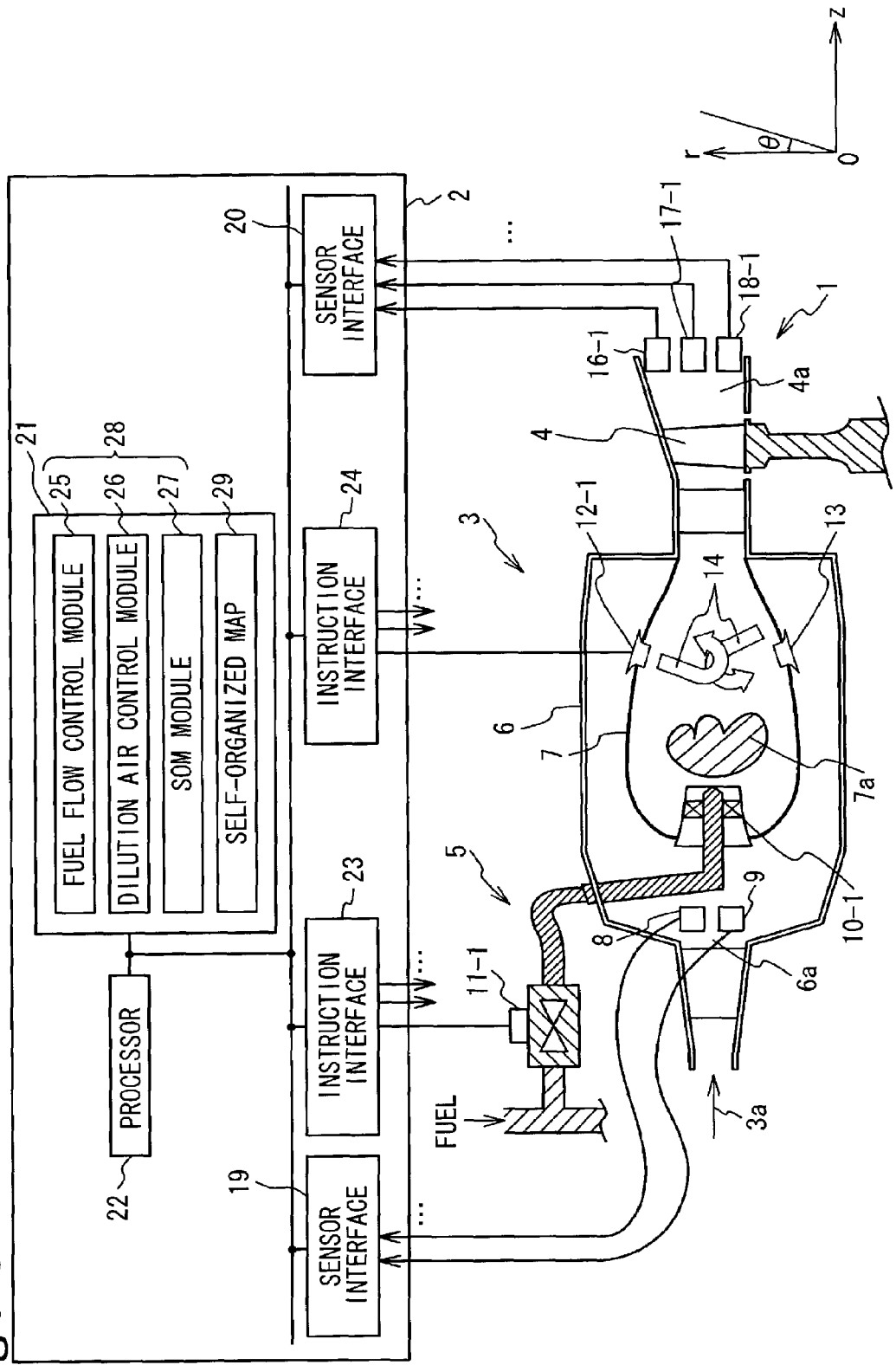
FIG. 8 shows a gas turbine engine system in another alternative embodiment.

For example, as shown in FIG. 8, the control of the gas turbine engine 1 may be independent of the turbine rotation speed NH, and the rotation sensor 15 may fail to be used for the control. The control algorithm is same except for that the input vector X is defined by $X=[X_1, X_2]$.

Figure 9:
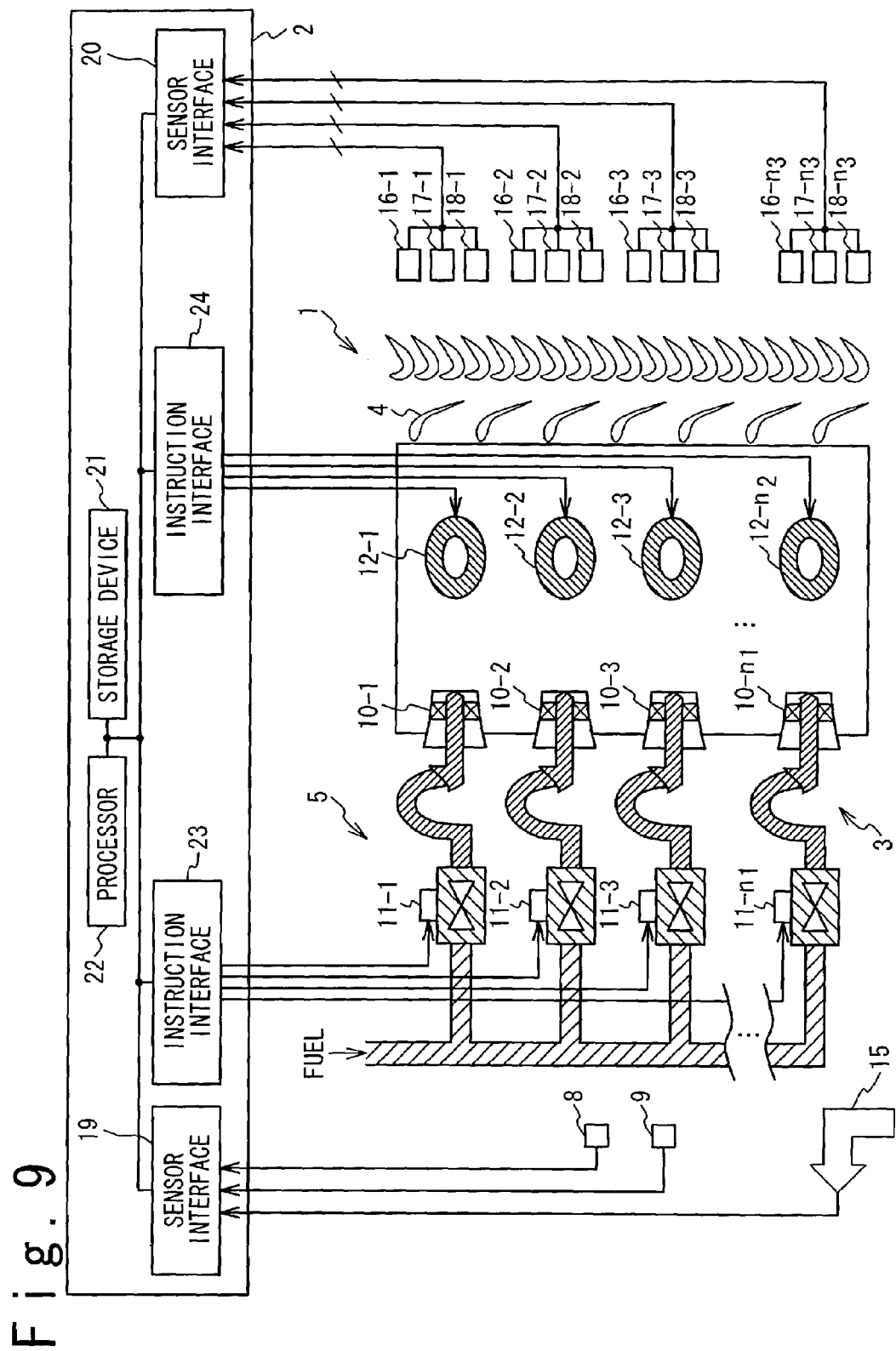
FIG. 9 shows a gas turbine engine system in still another alternative embodiment.

Those who are skilled in the art would appreciate that the numbers of the fuel flow regulators 11, the dilution air regulators 12, the $NO_x$ sensors 16, the CO sensors 17, and the turbine outlet temperature sensors 18 may be different from each other. As shown in FIG. 9, for example, $n_1$ fuel flow regulators 11-1 to 11-$n_1$, $n_2$ dilution air regulators 12-1 to 12-$n_2$, $n_3$ $NO_x$ sensors 16-1 to 16-$n_3$, CO sensors 17-1 to 17-$n_3$, and turbine outlet temperature sensors 18-1 to 18-$n_3$ may be provided for the gas turbine engine system.

Figure 10:
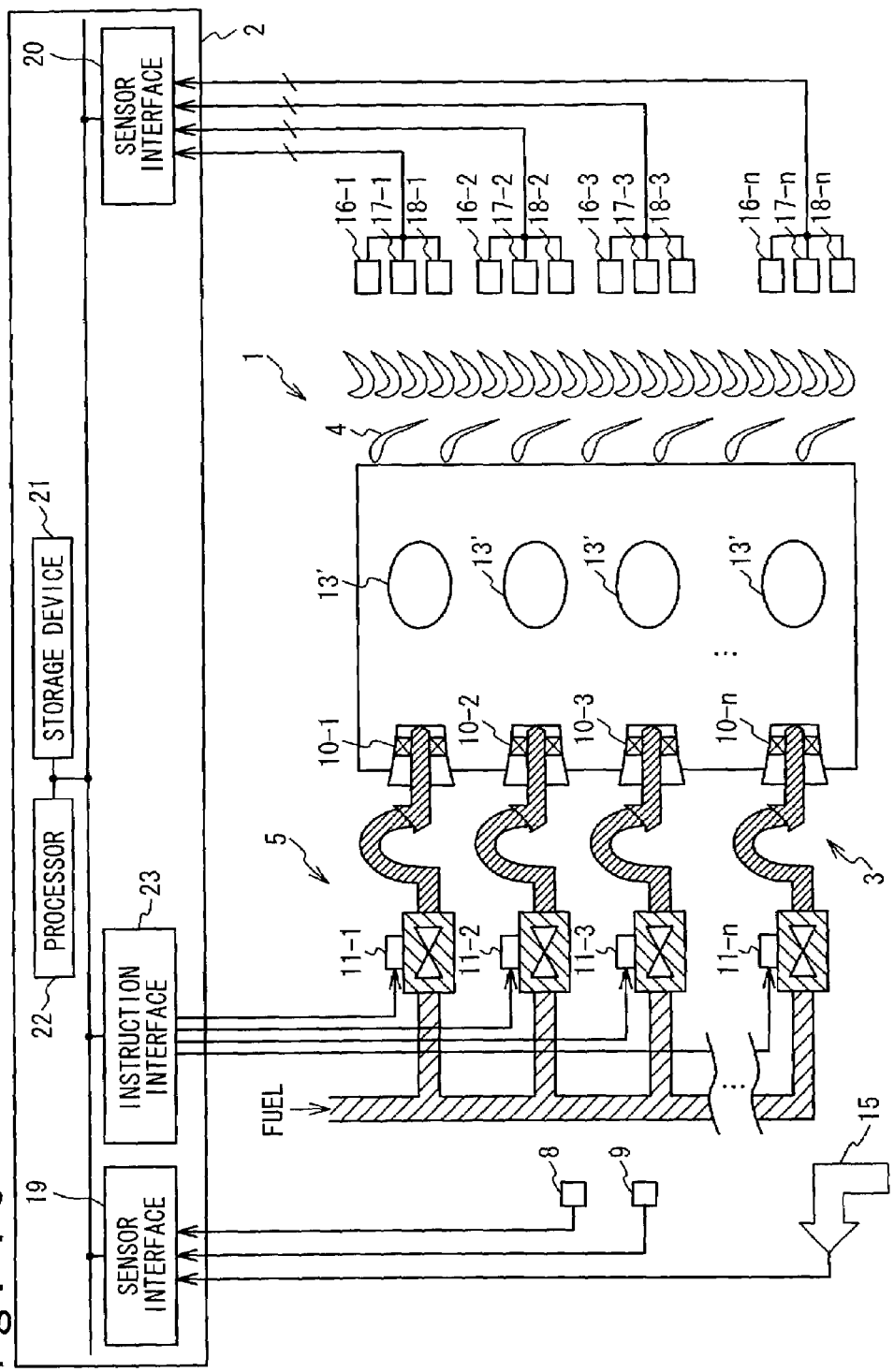
FIG. 10 shows a gas turbine engine system in still another alternative embodiment.

The control for homogenization of the turbine outlet temperature may be undone for simplicity of the control flow and structure of the gas turbine engine 1. In this case, as shown in FIG. 10, the dilution air regulators 12-1 to 12-$n$ may be replaced with dilution air holes 13'. Furthermore, the dilution air flow control module 26 may be deactivated to thereby omit Step S08 to Step S12 shown in FIG. 3.

Figure 11:
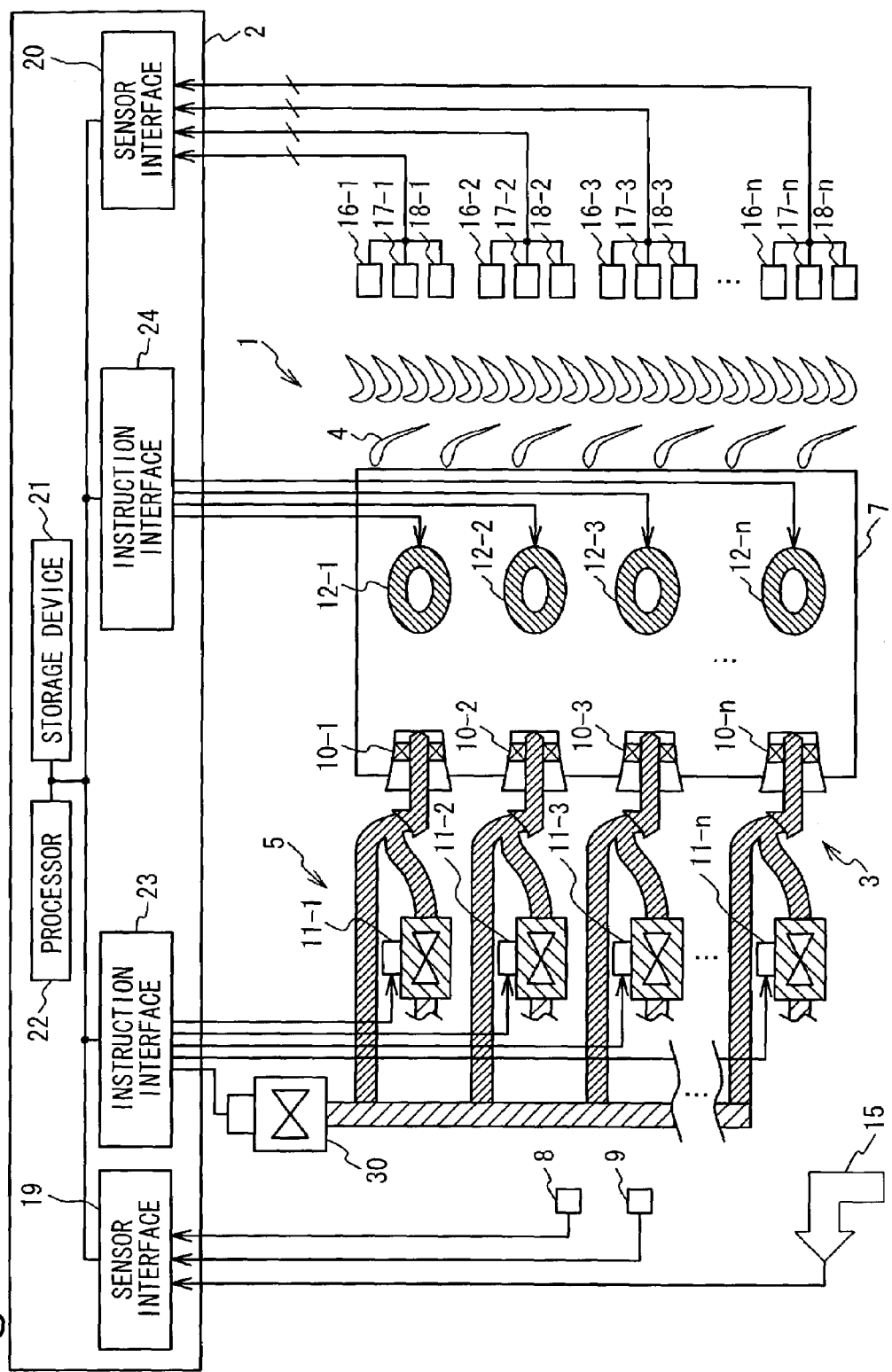
FIG. 11 shows a gas turbine engine system in still another alternative embodiment.

As shown in FIG. 11, the inlet of the fuel flow regulator 11-1 to 11-$n$ are connected to a main fuel flow regulator 30 which feed fuel to each of the flow controller 11-1 to 11-$n$. The main fuel flow regulator 30 regulates the sum of the fuel flows into the fuel nozzle 10-1 to 10-$n$ under the control of the controller 2.

This architecture enables reduction of the total weight of valves disposed in the fuel lines used for feeding fuel to the fuel nozzle 10-1 to 10-$n$. The architecture shown in FIG. 11 requires a large size valve in the main fuel flow regulator 30, and small size valves in the fuel flow regulators 11-1 to 11-$n$, while the architecture shown in FIG. 2 requires middle size valves in the fuel flow regulators 11-1 to 11-$n$. Although a large size valve is needed in the main fuel flow regulator 30, the total weight is effectively reduced, because the decrease in the weight caused by miniaturization of the valves in the flow controllers 11-1 to 11-$n$ is larger than the increase in the weight caused by the provision of the main fuel flow regulator 30. The architecture shown in FIG. 11, which effectively reduces the total weight, is especially advantageous if used for an aircraft engine.

In an alternative embodiment, the homogenization of the turbine outlet temperature may be achieved through control of the fuel flows into the fuel nozzles 10-1 to 10-$n$ in place of the dilution air flows.

Figure 12:
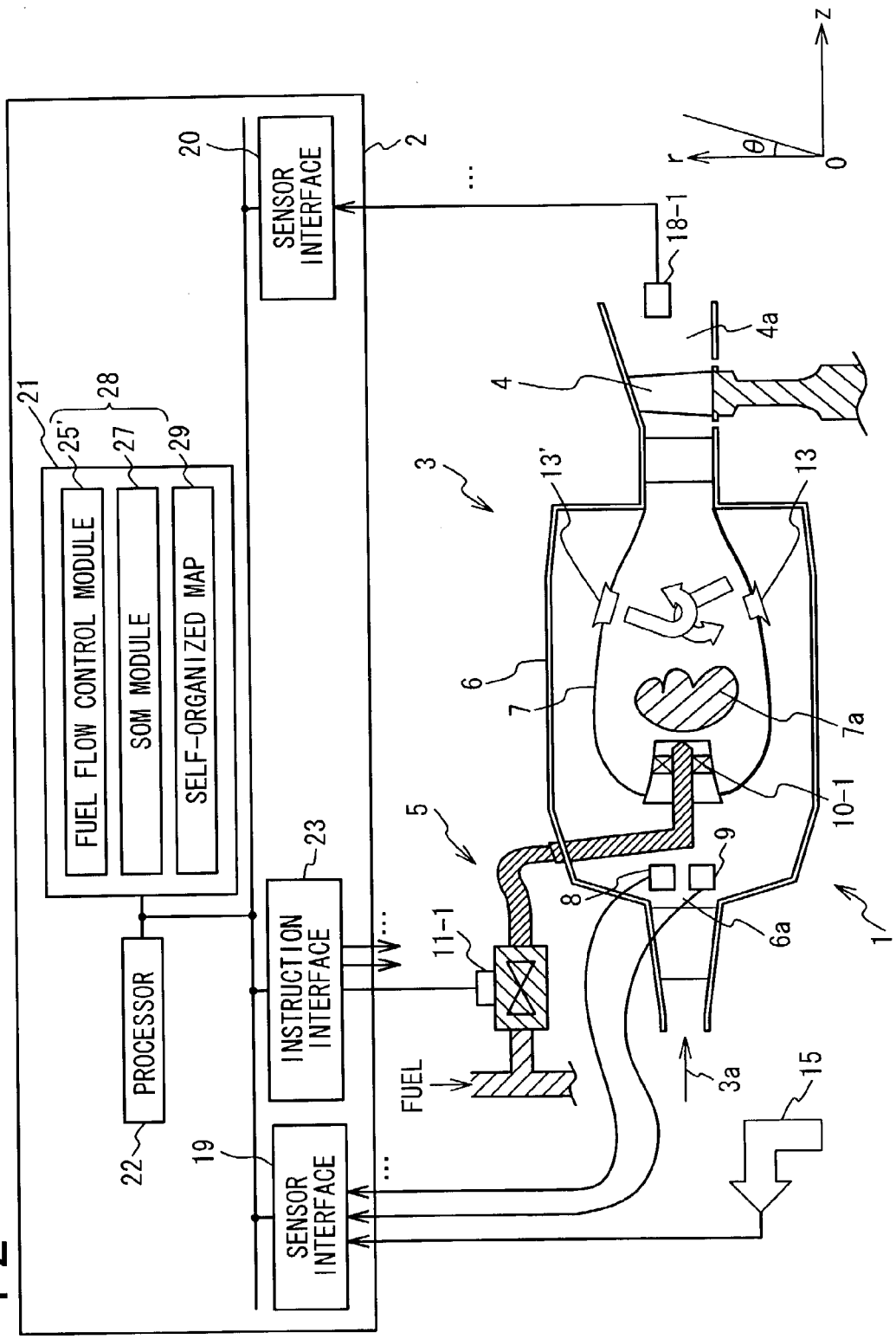
FIG. 12 shows a gas turbine engine system in still another alternative embodiment.

In this embodiment, the gas turbine engine system is modified as described in the following. As shown in FIG. 12, the dilution air regulators 12-1 to 12-$n$ are replaced with dilution air holes 13'. The dilution air flow control module 26 is not provided for the controller 2, and the fuel flow control module 25' is alternatively provided for the controller 2.

Figure 13:
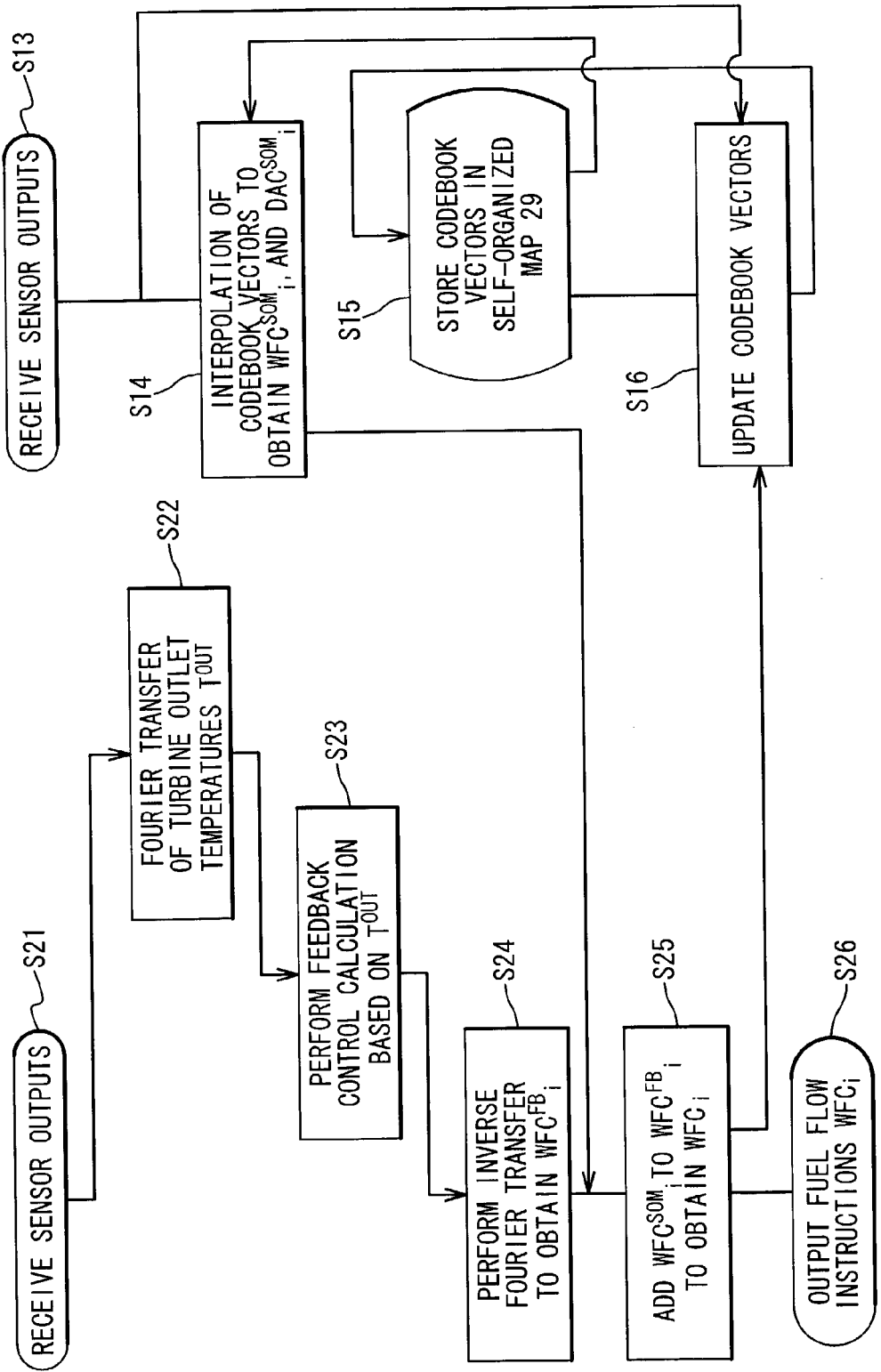
FIG. 13 shows a control flow of the gas turbine engine system shown in FIG. 12.

FIG. 13 shows an operation flow of the control software 28 in this embodiment. The turbine outlet temperatures $T^{OUT}_1$ to $T^{OUT}_n$ measured by the turbine outlet temperature sensors 18-1 to 18-$n$ are inputted to the controller 2 at Step 21. A discrete Fourier transform is then performed at Step S22 with respect to the distribution of the turbine outlet temperature, whish is represented by the turbine outlet temperatures $T^{OUT}_1$ to $T^{OUT}_n$ to obtain the Fourier coefficients $c'_0$ to $c'_{n/2}$, $c'_0$ being the spatial dc component, and $c'_j$ being component having a wave number of j.

At Step S23, a Fourier transform of feedback-control-based fuel flow instructions $WFC^{fb}_1$ to $WFC^{fb}_n$ is then calculated through the use of isochronous feedback control method on the basis of the Fourier coefficients $c'_0$ to $c'_{n/2}$ of the turbine outlet temperatures $T^{OUT}_1$ to $T^{OUT}_n$. The Fourier coefficients of feedback-control-based fuel flow instructions $WFC^{fb}_1$ to $WFC^{fb}_n$ are determined so that the components of the turbine outlet temperatures $T^{OUT}_1$ to $T^{OUT}_n$ other than the dc component are reduced to zero.

An inverse Fourier transform is then performed at Step S24 with respect to the Fourier transform of feedback-control-base fuel flow instructions $WFC^{fb}_1$ to $WFC^{fb}_n$ to obtain the feedback-control-based fuel flow instructions $WFC^{fb}_1$ to $WFC^{fb}_n$.

At Step S25, the fuel flow instructions $WFC_1$ to $WFC_n$ are calculated from the feedback-control-based fuel flow instructions $WFC^{fb}_1$ to $WFC^{fb}_n$ and the SOM-based fuel flow instructions $WFC^{SOM}_1$ to $WFC^{SOM}_n$. As described, the SOM-based fuel flow instructions $WFC^{SOM}_1$ to $WFC^{SOM}_n$ are obtained through the SOM algorithm by the SOM module 27 at Step S13 to S16. The fuel flow instructions $WFC_j$ is the sum of the feedback-control-based fuel flow instructions $WFC^{fb}_i$ and the SOM-based fuel flow instructions $WFC^{SOM}_i$.

At Step S26, the fuel flow instructions $WFC_1$ to $WFC_n$ are then outputted to the fuel flow regulators 11-1 to 11-$n$, respectively. The fuel flow regulators 11-1 to 11-$n$ are respectively responsive to the fuel flow instructions $WFC_1$ to $WFC_n$ to regulate the fuel flows into the fuel nozzles 10-1 to 10-$n$ at the desired values indicated in the fuel flow instructions $WFC_1$ to $WFC_n$.

The process thus-described allows the fuel flow instructions $WFC_1$ to $WFC_n$ to be determined so that the turbine outlet temperature is homogeneous. This effectively avoid the turbine 4 being damaged by excessively high turbine outlet temperature. In addition, the homogeneously regulated turbine outlet temperature allows the flame temperatures to be indirectly controlled to be homogenous in the circumferential direction. The homogenous flame temperatures in the combustor 3 effectively reduces emission level of environmental pollutant such as $NO_x$, CO and UHC.

What is claimed is:

1. A gas turbine system comprising:
a gas turbine engine including:
an annular combustor, and
a turbine driven by combustion gas from said annular combustor to rotate on a longitudinal centerline axis of said gas turbine engine; and
a controller,
wherein said annular combustor comprises:
an outer casing;
a liner disposed in said outer casing; and
a plurality of dilution air regulators introducing dilution air into said liner, said plurality of dilution air regulators being circumscribed about said longitudinal centerline axis and spaced apart at substantially equal intervals, and wherein said controller individually controls said plurality of dilution air regulators to individually adjust dilution air flows through each of said plurality of dilution air regulators into said liner.

2. The gas turbine system according to claim 1, further comprising:

a plurality of turbine outlet temperature sensors disposed at a turbine outlet of said turbine to measure turbine outlet temperatures at positions thereof, said plurality of turbine outlet temperature sensors being circumscribed about said longitudinal centerline axis, and spaced apart at equal intervals, wherein said controller adjusts said dilution air flows in response to said turbine outlet temperatures.

3. The gas turbine system according to claim 2, further comprising:

a combustor inlet state sensor disposed at an inlet of said annular combustor to obtain a state of said combustor inlet, wherein said controller includes a dilution air flow instruction producing unit producing a plurality of eventual dilution air flow instructions respectively associated with said plurality of dilution air regulators, wherein said dilution air flow instruction producing unit comprises:

a first module producing a plurality of feedback-based dilution flow instructions through an isochronous feedback control in response to said turbine outlet temperatures, a second module which establishes a self-organized map in response to said eventual dilution air flow instructions and said state of said combustor inlet, and produces a plurality of SOM-based dilution air flow instructions using an SOM algorithm based on said self-organized map, and a third module producing said plurality of eventual dilution air flow instructions from said plurality of feedback-based and SOM-based dilution air flow instructions, and wherein said plurality of dilution air regulators respectively introduce said dilution air into said liner in response to said plurality of eventual dilution air flow instructions associated therewith.

4. The gas turbine engine system according to claim 2, further comprising:

a rotation speed sensor measuring a rotation speed of said turbine, an temperature sensor measuring a combustor inlet temperature, and a pressure sensor measuring a combustor inlet pressure, wherein said controller includes a dilution air flow instruction producing unit producing a plurality of eventual dilution air flow instructions respectively associated with said plurality of dilution air regulators, wherein said dilution air flow instruction producing unit comprises:

a first module producing a plurality of feedback-based dilution air flow instructions through an isochronous feedback control in response to said turbine outlet temperatures, a second module which establishes a self-organized map in response to said eventual dilution air flow instructions, said rotation speed of said turbine, said combustor inlet temperature, and said combustor inlet pressure, and produces a plurality of SOM-based dilution air flow instructions using an SOM algorithm based on said self-organized map, and a third module producing said plurality of eventual dilution air flow instructions from said plurality of feedback-based and SOM-based dilution air flow instructions, and wherein said plurality of dilution air regulators respectively introduce said dilution air into said liner in response to said plurality of eventual dilution air flow instructions associated therewith.

5. A gas turbine system comprising:

a gas turbine engine including an annular combustor, and a turbine driven by combustion gas from said annular combustor to rotate on a longitudinal centerline axis of said gas turbine engine;

a plurality of fuel flow regulators; and a controller, wherein said annular combustor comprises:
an outer casing,
a liner disposed in said outer casing,
a plurality of fuel nozzles circumscribed about said longitudinal centerline axis, and spaced apart at substantially equal intervals, and
a plurality of dilution air regulators introducing dilution air into said liner, said plurality of dilution air regulators being circumscribed about said longitudinal centerline axis and spaced apart at substantially equal intervals, wherein said plurality of fuel flow regulators respectively feed fuel to said plurality of fuel nozzles, and wherein said controller individually controls said plurality of dilution air regulators to individually adjust dilution air flows through each of said plurality of dilution air regulators into said liner, and individually controls said plurality of fuel flow regulators to individually adjust fuel flows into each of said plurality of fuel nozzles.

6. The gas turbine system according to claim 5, further comprising:

a plurality of environmental pollutant sensor units disposed at a turbine outlet of said turbine to measure respective emission levels of environmental pollutant at positions thereof, said environmental pollutant sensor units being circumscribed about said longitudinal centerline axis and spaced apart at substantially equal intervals, a plurality of turbine outlet temperature sensors disposed at a turbine outlet of said turbine to measure turbine outlet temperatures at positions thereof, said plurality of turbine outlet temperature sensors being circumscribed about said longitudinal centerline axis, and spaced apart at equal intervals, wherein said controller adjusts said dilution air flows in response to said turbine outlet temperatures, and adjusts said fuel flows in response to said emission levels of said environmental pollutant.

7. The gas turbine system according to claim 6, wherein each of said plurality of environmental pollutant sensor units includes:

a $NO_x$ sensor measuring a $NO_x$ emission level, and
a CO sensor measuring a CO emission level, and wherein said controller adjusts said fuel flows in response to said $NO_x$ emission levels and said CO emission levels.

8. The gas turbine system according to claim 7, wherein said controller calculates a set of emission indices through an emission evaluation function which includes a first term dependent on a logarithm of said $NO_x$ emission levels, and a second term dependent on a logarithm of said CO emission levels, and wherein said controller adjusts said fuel flows in response to said set of emission indices.

9. The gas turbine system according to claim 6, wherein each of said plurality of environmental pollutant sensor units includes:

a $NO_x$ sensor measuring a $NO_x$ emission level, and an UHC (unburned hydrocarbon) sensor measuring an UHC emission level, and wherein said controller adjusts said fuel flows in response to said $NO_x$ emission levels and said UHC emission levels.

10. The gas turbine system according to claim 9, wherein said controller calculates a set of emission indices through an emission evaluation function which includes a first term dependent on a logarithm of said $NO_x$ emission levels, and a second term dependent on a logarithm of said UHC emission levels, and wherein said controller adjusts said fuel flows in response to said set of emission indices.

11. The gas turbine engine system according to claim 6, further comprising:

a rotation speed sensor measuring a rotation speed of said turbine, an temperature sensor measuring a combustor inlet temperature, and a pressure sensor measuring a combustor inlet pressure, wherein said controller includes an instruction producing unit producing a plurality of eventual fuel flow instructions respectively associated with said plurality of fuel nozzles, and a plurality of eventual dilution air flow instructions respectively associated with said plurality of dilution air regulators, and, wherein said instruction producing unit comprises:

a first module producing a plurality of feedback-based fuel flow instructions through an isochronous feedback control in response to said emission levels of said environmental pollutant, a second module producing a plurality of feedback-based dilution air flow instructions through another isochronous feedback control in response to said turbine outlet temperatures, a third module which establishes a self-organized map in response to said eventual fuel flow instructions, said eventual dilution air flow instructions, said rotation speed of said turbine, said combustor inlet temperature, and said combustor inlet pressure, and produces a plurality of SOM based fuel flow instructions, and a plurality of SOM-based dilution air flow instructions using an SGM algorithm based on said self-organized map, and a fourth module producing said plurality of eventual fuel flow instructions from said plurality of feedback-based and SOM-based fuel flow instructions, while producing said plurality of eventual dilution air flow instructions from said plurality of feedback-based and SOM-based dilution air flow instructions, wherein said plurality of fuel flow regulators respectively feed said fuel to said plurality of fuel nozzles in response to said plurality of eventual fuel flow instructions associated therewith, and wherein said plurality of dilution air regulators respectively introduce said dilution air into said liner in response to said plurality of eventual dilution air flow instructions associated therewith.

12. A gas turbine system comprising:
a gas turbine engine including:
an annular combustor comprising a plurality of fuel nozzles circumscribed about an longitudinal centerline axis of said gas turbine engine, and spaced apart at substantially equal intervals, and a turbine driven by combustion gas from said annular combustor to rotate on said longitudinal centerline axis;

a plurality of fuel flow regulators respectively feeding fuel to said plurality of fuel nozzles;

a controller individually controlling said plurality of fuel flow regulators to individually adjust fuel flows into each of said fuel nozzles; and a plurality of environmental pollutant sensor units disposed at a turbine outlet of said turbine to measure respective emission levels of environmental pollutant at positions thereof, said environmental pollutant sensor units being circumscribed about said longitudinal centerline axis and spaced apart at substantially equal intervals, wherein said controller adjusts said fuel flows in response to said emission levels of said environmental pollutant, and wherein each of said plurality of environmental pollutant sensor units includes:

a $NO_x$ sensor measuring a $NO_x$ emission level, and a CO sensor measuring a CO emission level, and wherein said controller adjusts said fuel flows in response to said $NO_x$ emission levels and said CO emission levels.

13. A gas turbine system comprising:
a gas turbine engine including:
an annular combustor comprising a plurality of fuel nozzles circumscribed about an longitudinal centerline axis of said gas turbine engine, and spaced apart at substantially equal intervals, and a turbine driven by combustion gas from said annular combustor to rotate on said longitudinal centerline axis;

a plurality of fuel flow regulators respectively feeding fuel to said plurality of fuel nozzles;

a controller individually controlling said plurality of fuel flow regulators to individually adjust fuel flows into each of said fuel nozzles; and a plurality of environmental pollutant sensor units disposed at a turbine outlet of said turbine to measure respective emission levels of environmental pollutant at positions thereof, said environmental pollutant sensor units being circumscribed about said longitudinal centerline axis and spaced apart at substantially equal intervals, wherein said controller adjusts said fuel flows in response to said emission levels of said environmental pollutant, wherein each of said plurality of environmental pollutant sensor units includes:

a $NO_x$ sensor measuring a $NO_x$ emission level, and an UHC (unburned hydrocarbon) sensor measuring an UHC emission level, and wherein said controller adjusts said fuel flows in response to said $NO_x$ emission levels and said UHC emission levels.

14. A gas turbine system comprising:
a gas turbine engine including:
an annular combustor comprising a plurality of fuel nozzles circumscribed about an longitudinal centerline axis of said gas turbine engine, and spaced apart at substantially equal intervals, and
a turbine driven by combustion gas from said annular combustor to rotate on said longitudinal centerline axis;
a plurality of fuel flow regulators respectively feeding fuel to said plurality of fuel nozzles;
a controller individually controlling said plurality of fuel flow regulators to individually adjust fuel flows into each of said fuel nozzles;
a plurality of environmental pollutant sensor units disposed at a turbine outlet of said turbine to measure respective emission levels of environmental pollutant at positions thereof, said environmental pollutant sensor units being circumscribed about said longitudinal centerline axis and spaced apart at substantially equal intervals, wherein said controller adjusts said fuel flows in response to said emission levels of said environmental pollutant; and
a combustor inlet state sensor disposed at an inlet of said combustor to obtain a state of said combustor inlet,
wherein said controller includes a fuel flow instruction producing unit producing a plurality of eventual fuel flow instructions respectively associated with said plurality of fuel nozzles,
wherein said fuel flow instruction producing unit comprises:
 a first module producing a plurality of feedback-based fuel flow instructions through an isochronous feedback control in response to said emission levels of said environmental pollutant,
 a second module which establishes a self-organized map in response to said eventual fuel flow instructions and said state of said combustor inlet, and produces a plurality of SOM-based fuel flow instructions using an SOM algorithm based on said self-organized map, and
 a third module producing said plurality of eventual fuel flow instructions from said plurality of feedback-based and SOM-based fuel flow instructions, and
wherein said plurality of fuel flow regulators respectively feed said fuel to said plurality of fuel nozzles in response to said plurality of eventual fuel flow instructions associated therewith.

15. A gas turbine engine system comprising:
a gas turbine engine including:
 an annular combustor comprising a plurality of fuel nozzles circumscribed about an longitudinal centerline axis of said gas turbine engine, and spaced apart at substantially equal intervals, and
 a turbine driven by combustion gas from said annular combustor to rotate on said longitudinal centerline axis;
a plurality of fuel flow regulators respectively feeding fuel to said plurality of fuel nozzles;
a controller individually controlling said plurality of fuel flow regulators to individually adjust fuel flows into each of said fuel nozzles; and
a plurality of environmental pollutant sensor units disposed at a turbine outlet of said turbine to measure respective emission levels of environmental pollutant at positions thereof, said environmental pollutant sensor units being circumscribed about said longitudinal centerline axis and spaced apart at substantially equal intervals, wherein said controller adjusts said fuel flows in response to said emission levels of said environmental pollutant;
a rotation speed sensor measuring a rotation speed of said turbine;
an temperature sensor measuring a combustor inlet temperature; and
a pressure sensor measuring a combustor inlet pressure,
wherein said controller includes a fuel flow instruction producing unit producing a plurality of eventual fuel flow instructions respectively associated with said plurality of fuel nozzles,
wherein said fuel flow instruction producing unit comprises:
 a first module producing a plurality of feedback-based fuel flow instructions through an isochronous feedback control in response to said emission levels of said environmental pollutant;
 a second module which establishes a self-organized map in response to said eventual fuel flow instructions, said rotation speed of said turbine, said combustor inlet temperature, and said combustor inlet pressure, and produces a plurality of SOM-based fuel flow instructions using an SOM algorithm based on said self-organized map; and
 a third module producing said plurality of eventual fuel flow instructions from said plurality of feedback-based and SOM-based fuel flow instructions, and
wherein said plurality of fuel flow regulators respectively feed said fuel to said plurality of fuel nozzles in response to said plurality of eventual fuel flow instructions associated therewith.

16. A method for operating a gas turbine engine comprising:
providing a gas turbine engine including:
 an annular combustor comprising:
  an outer casing;
  a liner disposed in said outer casing;
  a plurality of dilution air regulators introducing dilution air into said liner, said plurality of dilution air regulators being circumscribed about a longitudinal centerline axis of said gas turbine engine and spaced apart at equal intervals, and
 a turbine driven by combustion gas from said annular combustor to rotate on said longitudinal centerline axis,
individually adjusting dilution air flows through each of said plurality of dilution air regulators.

* * * * *